(12) United States Patent
Kumari et al.

(10) Patent No.: US 11,631,205 B2
(45) Date of Patent: *Apr. 18, 2023

(54) GENERATING A DATA VISUALIZATION GRAPH UTILIZING MODULARITY-BASED MANIFOLD TEARING

(71) Applicant: Adobe Inc., San Jose, CA (US)

(72) Inventors: Nupur Kumari, Noida (IN); Piyush Gupta, Noida (IN); Akash Rupela, Rohini (IN); Siddarth R, Noida (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,255

(22) Filed: Mar. 30, 2022

(65) Prior Publication Data

US 2022/0230369 A1 Jul. 21, 2022

Related U.S. Application Data

(63) Continuation of application No. 16/850,677, filed on Apr. 16, 2020, now Pat. No. 11,295,491.

(51) Int. Cl.
*G06T 11/20* (2006.01)
*G06F 17/11* (2006.01)

(52) U.S. Cl.
CPC ............ *G06T 11/206* (2013.01); *G06F 17/11* (2013.01); *G06T 2200/24* (2013.01)

(58) Field of Classification Search
CPC ..... G06T 11/206; G06T 2200/24; G06F 17/11
See application file for complete search history.

(56) References Cited

U.S. PATENT DOCUMENTS

2016/0350389 A1 12/2016 Kloke et al.

OTHER PUBLICATIONS

[Singh et al., 2007] Singh, G., Memoli, F., and Carlsson, G. E. (2007). Topological methods for the analysis of high dimensional data sets and 3d object recognition. In SPBG, pp. 91-100.
Deb, B., Sarkar, A., Kumari, N., Rupela, A., Gupta, P., & Krishnamurthy, B. (Nov. 2018). Multimapper: Data Density Sensitive Topological Visualization. In 2018 IEEE International Conference on Data Mining Workshops (ICDMW) (pp. 1054-1061). IEEE.

(Continued)

*Primary Examiner* — Michelle L Sams
(74) *Attorney, Agent, or Firm* — Keller Preece PLLC

(57) ABSTRACT

The present disclosure relates to systems, methods, and non-transitory computer-readable media that generate interactive visual shape representation of digital datasets. For example, the disclosed systems can generate an augmented nearest neighbor network graph from a sampled subset of digital data points using a nearest neighbor model and witness complex model. The disclosed system can further generate a landmark network graph based on the augmented nearest neighbor network graph utilizing a plurality of random walks. The disclosed systems can also generate a loop-augmented spanning network graph based on a partition of the landmark network graph by adding community edges between communities of landmark groups based on modularity and to complete community loops. Based on the (Continued)

loop-augmented spanning network graph, the disclosed systems can generate an interactive visual shape representation for display on a client device.

20 Claims, 22 Drawing Sheets

(56) References Cited

OTHER PUBLICATIONS

McInnes, L., Healy, J., & Melville, J. (2018). Umap: Uniform manifold approximation and projection for dimension reduction. arXiv preprint arXiv:1802.03426.
Maaten, Laurens van der, and Geoffrey Hinton. "Visualizing data using t-SNE." Journal of machine learning research (Nov. 9, 2008): 2579-2605.
Wold, Svante, Kim Esbensen, and Paul Geladi. "Principal component analysis." Chemometrics and intelligent laboratory systems 2.1-3 (1987): 37-52.
Ayasdi. (2019). Artificial Intelligence for the Enterprise | Ayasdi. [online] Available at: https://www.ayasdi.com/ [Accessed Aug. 26, 2019].
Stolz, Bernadette, Heather Harrington, and Mason Alexander Porter. "The Topological Shape of Brexit." Available at SSRN 2843662 (2016).
Vejdemo-Johansson, Mikael, et al. "The topology of politics: voting connectivity in the us house of representatives." NIPS 2012 Workshop on Algebraic Topology and Machine Learning. 2012.
Saggar, Manish, et al. "Towards a new approach to reveal dynamical organization of the brain using topological data analysis." Nature communications 9.1 (2018): 1399.
Nielson, Jessica L., et al. "Topological data analysis for discovery in preclinical spinal cord injury and traumatic brain injury." Nature communications 6 (2015): 8581.
Guo, Yun, et al. "Examine Manipulated Datasets with Topology Data Analysis: A Case Study." International Conference on Information and Communications Security. Springer, Cham, 2018.
Novak, Thomas P., and Donna L. Hoffman. "Using topological data analysis to explore emergent consumer experience from digital interactions." keynote presentation at the Center for Complexity in Business Annual Conference, Washington, Dc, Nov.. 2015.
Nicolau, Monica, Arnold J. Levine, and Gunnar Carlsson. "Topology based data analysis identifies a subgroup of breast cancers with a unique mutational profile and excellent survival." Proceedings of the National Academy of Sciences 108.17 (2011): 7265-7270.
Li, Li, et al. "Identification of type 2 diabetes subgroups through topological analysis of patient similarity." Science translational medicine 7.311 (2015): 311ra174-311ra174.
Hajij, Mustafa, Basem Assiri, and Paul Rosen. "Distributed mapper." arXiv preprint arXiv:1712.03660 (2017).
Tang, Jian, et al. "Visualizing large-scale and high-dimensional data." Proceedings of the 25th international conference on world wide web. International World Wide Web Conferences Steering Committee, 2016.
"GloVe: Global Vectors for Word Representation"; Date downloaded Apr. 21, 2020; https://nlp.stanford.edu/projects/glove/.
"Word2vec-GoogleNews-vectors"; Date downloaded Apr. 21, 2020; https://github.com/mmihaltz/word2vec-GoogleNews-vectors.
Carriere, Mathieu, Bertrand Michel, and Steve Oudot. "Statistical analysis and parameter selection for Mapper." The Journal of Machine Learning Research 19.1 (2018): 478-516.
Chazal, Frédéric, and Bertrand Michel. "An introduction to Topological Data Analysis: fundamental and practical aspects for data scientists." arXiv preprint arXiv:1710.04019 (2017).
Reaven, G. M., and R. G. Miller. "An attempt to define the nature of chemical diabetes using a multidimensional analysis." Diabetologia 16.1 (1979): 17-24.
Miller, Rupert G. "Discussion: Projection Pursuit." The Annals of Statistics 13.2 (1985): 510-513.
Blondel, Vincent D., et al. "Fast unfolding of communities in large networks." Journal of statistical mechanics: theory and experiment Oct. 2008. (2008): P10008.
Shi, Hao, et al. "Robust 1-Isomap with a novel landmark selection method." Mathematical Problems in Engineering 2017 (2017).
Tang, Jian, et al. "Line: Large-scale information network embedding." Proceedings of the 24th international conference on world wide web. International World Wide Web Conferences Steering Committee, 2015.
"Segment AI"; Date downloaded Apr. 21, 2020; https://xd.adobe.com/view/00006186-11a3-40d9-44a9-3bbe55614a4c-7631/.
Mikhail Belkin and Partha Niyogi. 2003. Laplacian eigenmaps for dimensionality reduction and data representation. Neural computation 15, 6 (2003), 1373-1396.
Yoshua Bengio, Aaron Courville, and Pascal Vincent. 2013. Representation learning: A review and new perspectives. IEEE transactions on pattern analysis and machine intelligence 35, 8 (2013), 1798-1828.
Silvia Biasotti, Daniela Giorgi, Michela Spagnuolo, and Bianca Falcidieno. 2008. Reeb graphs for shape analysis and applications. Theoretical computer science 392, 1-3 (2008), 5-22.
Mickaël Buchet, Yasuaki Hiraoka, and Ippei Obayashi. 2018. Persistent homology and materials informatics. In Nanoinformatics. Springer, Singapore, 75-95.
Pablo G Cámara. 2017. Topological methods for genomics: present and future directions. Current opinion in systems biology 1 (2017), 95-101.
Pablo G Camara, Daniel IS Rosenbloom, Kevin JEmmett, ArnoldJ Levine, and Raul Rabadan. 2016. Topological data analysis generates high-resolution, genome-wide maps of human recombination. Cell systems 3, 1 (2016), 83-94.
Gunnar Carlsson, Tigran Ishkhanov, Vin De Silva, and Afra Zomorodian. 2008. On the local behavior of spaces of natural images. International journal of computer vision 76, 1 (2008), 1-12.
Mathieu Carriere, Bertrand Michel, and Steve Oudot. 2018. Statistical analysis and parameter selection for Mapper. The Journal of Machine Learning Research 19, 1 (2018), 478-516.
Corrie J Carstens and Kathy J Horadam. 2013. Persistent homology of collaboration networks. Mathematical problems in engineering 2013 (2013).
Anne Collins, Afra Zomorodian, Gunnar Carlsson, and LeonidasJ Guibas. 2004. A barcode shape descriptor for curve point cloud data. Computers & Graphics 28, 6 (2004), 881-894.
Mark de Berg, Otfried Cheong, Marc van Kreveld, and Mark Overmars. 2008. Delaunay triangulations: height interpolation. Computational Geometry: Algorithms and Applications (2008), 191-218.
Pasquale De Meo, Emilio Ferrara, Giacomo Fiumara, and Alessandro Provetti. 2011. Generalized louvain method for community detection in large networks. In 2011 11th International Conference on Intelligent Systems Design and Applications. IEEE, 88-93.
Vin de Silva and Gunnar Carlsson. 2004. Topological estimation using witness complexes. In Proceedings of the First Eurographics conference on Point-Based Graphics. Eurographics Association, 157-166. https://doi.org/10.2312/SPBG/ SPBG04/157- 166.
Vin de Silva and Robert Ghrist. 2007. Coverage in sensor networks via persistent homology. Algebr. Geom. Topol. 7, 1 (2007), 339-358. https://doi.org/10.2140/agt. 2007.7.339.
Marian Gidea. 2017. Topological data analysis of critical transitions in financial networks. In International Conference and School on Network Science. Springer, 47-59.
Leonidas J Guibas and Steve Y Oudot. 2008. Reconstruction using witness com-plexes. Discrete & computational geometry 40, 3 (2008), 325-356.
Allen Hatcher. 2002. Algebraic topology. Cambridge University Press, Cambridge. xii+61 pages.
Allen Hatcher. 2002. Algebraic topology. Cambridge University Press, Cambridge. 62+131 pages.
Allen Hatcher. 2002. Algebraic topology. Cambridge University Press, Cambridge. 132+201 pages.
Allen Hatcher. 2002. Algebraic topology. Cambridge University Press, Cambridge. 202+271 pages.
Allen Hatcher. 2002. Algebraic topology. Cambridge University Press, Cambridge. 272+341 pages.

(56) References Cited

OTHER PUBLICATIONS

Allen Hatcher. 2002. Algebraic topology. Cambridge University Press, Cambridge. 342+411 pages.
Allen Hatcher. 2002. Algebraic topology. Cambridge University Press, Cambridge. 412+481 pages.
Allen Hatcher. 2002. Algebraic topology. Cambridge University Press, Cambridge. 482+551 pages.
Geoffrey E Hinton and Sam T Roweis. 2003. Stochastic neighbor embedding. In Advances in neural information processing systems. 857-864.
Violeta Kovacev-Nikolic, Peter Bubenik, Dragan Nikolić, and Giseon Heo. 2016. Using persistent homology and dynamical distances to analyze protein binding. Statistical applications in genetics and molecular biology 15, 1 (2016), 19-38.
Johannes F Kruiger, Paulo E Rauber, Rafael M Martins, Andreas Kerren, Stephen Kobourov, and Alexandru C Telea. 2017. Graph Layouts by t-SNE. In Computer Graphics Forum, vol. 36. Wiley Online Library, 283-294.
Joseph B Kruskal and Myron Wish. 1978. Multidimensional scaling. vol. 11. Sage.
Yan Lecun, B. Boser, J.S. Denker, D. Henderson, R.E. Howard, W. Hubbard, and L.D. Jacket. 1989. Backpropagation applied to handwritten zip code recognition.
Hyekyoung Lee, Moo K Chung, Hyejin Kang, Bung-Nyun Kim, and Dong Soo Lee. 2011. Discriminative persistent homology of brain networks. In 2011 IEEE International Symposium on Biomedical Imaging: From Nano to Macro. IEEE, 841-844.
John Aldo Lee and Michel Verleysen. 2005. Nonlinear dimensionality reduction of data manifolds with essential loops. Neurocomputing 67 (2005), 29-53.
Yongjin Lee, Senja D Barthel, Pawel Dlotko, Seyed Mohamad Moosavi, Kathryn Hess, and Berend Smit. 2018. High-throughput screening approach for nanoporous materials genome using topological data analysis: application to zeolites. Journal of chemical theory and computation 14, 8 (2018), 4427-4437.
Ying-KeLei, Zhu-Hong You, Tianbao Dong, Yun-Xiao Jiang, and Jun-An Yang. 2013. Increasing reliability of protein interactome by fast manifold embedding. Pattern Recognition Letters 34, 4 (2013), 372-379.
David Letscher and Jason Fritts. 2007. Image segmentation using topological persistence. In International Conference on Computer Analysis of Images and Patterns. Springer, 587-595.
Dong Liang, Chen Qiao, and Zongben Xu. 2015 Enhancing both efficiency and representational capability of isomap by extensive landmark selection. Mathematical Problems in Engineering 2015 (2015).
Laurens van der Maaten and Geoffrey Hinton. 2008.Visualizing data using t-SNE. Journal of machine learning research 9, (Nov. 2008), 2579-2605.
Leland McInnes, John Healy, and James Melville. 2018. Umap: Uniform manifold approximation and projection for dimension reduction. arXiv preprint arXiv:1802.03426 (2018).
Tomas Mikolov, Ilya Sutskever, Kai Chen, Greg S Corrado, and Jeff Dean. 2013. Distributed representations of words and phrases and their compositionality. In Advances in neural information processing systems. 3111-3119.
James Munkres. 2014. Topology. Pearson Education. pp. iii-240.
James Munkres. 2014. Topology. Pearson Education. pp. 241-537.
Monica Nicolau, Arnold J Levine, and Gunnar Carlsson. 2011. Topology based data analysis identifies a subgroup of breast cancers with a unique mutational profile and excellent survival. Proceedings of the National Academy of Sciences 108, 17 (2011), 7265-7270.
Alice Patania, Giovanni Petri, and Francesco Vaccarino. 2017. The shape of collaborations. EPJ Data Science 6, 1 (2017), 18.
Nicola Pezzotti, Thomas Höllt, B Lelieveldt, Elmar Eisemann, and Anna Vilanova. 2016. Hierarchical stochastic neighbor embedding in Computer Graphics Forum, vol. 35. Wiley Online Library, 21-30.

Ashutosh Saxena, Abhinav Gupta, and Amitabha Mukerjee. 2004. Non-linear dimensionality reduction by locally linear isomaps. In International Conference on Neural Information Processing. Springer, 1038-1043.
Michael Sedlmair, Tamara Munzner, and Melanie Tory. 2013. Empirical Guidance on Scatterplot and Dimension Reduction Technique Choices. IEEE Trans. Vis. Comput. Graph. 19, 12 (2013), 2634-2643. http://dblp.uni-trier.de/db/journals/tvcg/tvcg19.html#SedlmairMT13.
Lee M Seversky, Shelby Davis, and Matthew Berger. 2016. On time-series topological data analysis: New data and opportunities. In Proceedings of the IEEE Conference on Computer Vision and Pattern Recognition Workshops. 59-67.
Hao Shi, Baoqun Yin, Yu Kang, Chao Shao, and Jie Gui. 2017. Robust l-Isomap with a novel landmark selection method. Mathematical Problems in Engineering 2017 (2017).
Vin D Silva and Joshua B Tenenbaum. 2003. Global versus local methods in nonlinear dimensionality reduction. In Advances in neural information processing systems. 721-728.
Gurjeet Singh, Facundo Mémoli, and Gunnar E Carlsson. 2007. Topological methods for the analysis of high dimensional data sets and 3d object recognition. In SPBG. 91-100.
Jian Tang, Jingzhou Liu, Ming Zhang, and Qiaozhu Mei. 2016. Visualizing large-scale and high-dimensional data. In Proceedings of the 25th international conference on world wide web. International World Wide Web Conferences Steering Committee, 287-297.
Jian Tang, Meng Qu, Mingzhe Wang, Ming Zhang, Jun Yan, and Qiaozhu Mei. 2015. Line: Large-scale information network embedding. In Proceedings of the 24th international conference on world wide web. International World Wide Web Conferences Steering Committee, 1067-1077.
Vincent A Traag, Ludo Waltman, and Nees Jan van Eck. 2019. From Louvain to Leiden: guaranteeing well-connected communities. Scientific reports 9 (2019).
Laurens Van Der Maaten. 2014. Accelerating t-SNE using tree-based algorithms. The Journal of Machine Learning Research 15, 1 (2014), 3221-3245.
Martin Wattenberg, Fernanda ViÃl'gas, and Ian Johnson. 2016. How to Use t-SNE Effectively. Distill (2016). https://doi.org/10.23915/distill.00002.
Svante Wold, Kim Esbensen, and Paul Geladi. 1987. Principal component analysis. Chemometrics and intelligent laboratory systems 2, 1-3 (1987), 37-52.
Han Xiao, Kashif Rasul, and Roland Vollgraf. 2017. Fashion— MNIST: a Novel Image Dataset for Benchmarking Machine Learning Algorithms. arXiv:cs.LG/cs.LG/1708.07747.
Jaewon Yang and Jure Leskovec. 2015. Defining and evaluating network communities based on ground-truth. Knowledge and Information Systems 42, 1 (2015), 181-213.
U.S. Appl. No. 16/850,677, Nov. 23, 2021, Notice of Allowance.
Maaten, Laurens van der, and Geoffrey Hinton. "Visualizing data using t-SNE." Journal of machine learning research 9.(Nov. 2008): 2579-2605.
Shi, Hao, et al. "Robust I-Isomap with a novel landmark selection method." Mathematical Problems in Engineering 2017 (2017).
Pasquale De Meo, Emilio Ferrara, Giacomo Fiumara, and Alessandro Provetti. 2011. Generalized Touvain method for community detection in large networks. In 2011 11th International Conference on Intelligent Systems Design and Applications. IEEE, 88-93.
Yan Lecun, B. Boser, U.S. Denker, D. Henderson, R.E. Howard, W. Hubbard, and L.D. Jackel. 1989. Backpropagation applied to handwritten zip code recognition.
Yongjin Lee, Senja D Barthel, Pawel Dlotko, Seyed Mohamad Moosavi, Kathryn Hess, and Berend Smit. 2018. High-throughput screening approach for nanoporous materials genome using topological data analysis: application to zeolites. Journal of chemical theory and computation 14, 8 (2018), 4427-4437.
Tomas Mikolov, Ilya Sutskever, Kai Chen, Greg S Corrado, and Jeff Dean. 2013. Distributed Yepresentations of words and phrases and their compositionality. In Advances in neural information processing systems. 3111-3119.

(56) References Cited

OTHER PUBLICATIONS

Ashutosh Saxena, Abhinav Gupta, and Amitabha Mukerjee. 2004. Non-linear dimensionality Yeduction by locally linear isomaps. In International Conference on Neural Information Processing. Springer, 1038-1043.

Hao Shi, Baoqun Yin, Yu Kang, Chao Shao, and Jie Gui. 2017. Robust I-Isomap with a novel landmark selection method. Mathematical Problems in Engineering 2017 (2017).

Jaewon Yang and Jure Leskovec. 2015. Defining and evaluating network communities base on ground-truth. Knowledge and Information Systems 42, 1 (2015), 181-213.

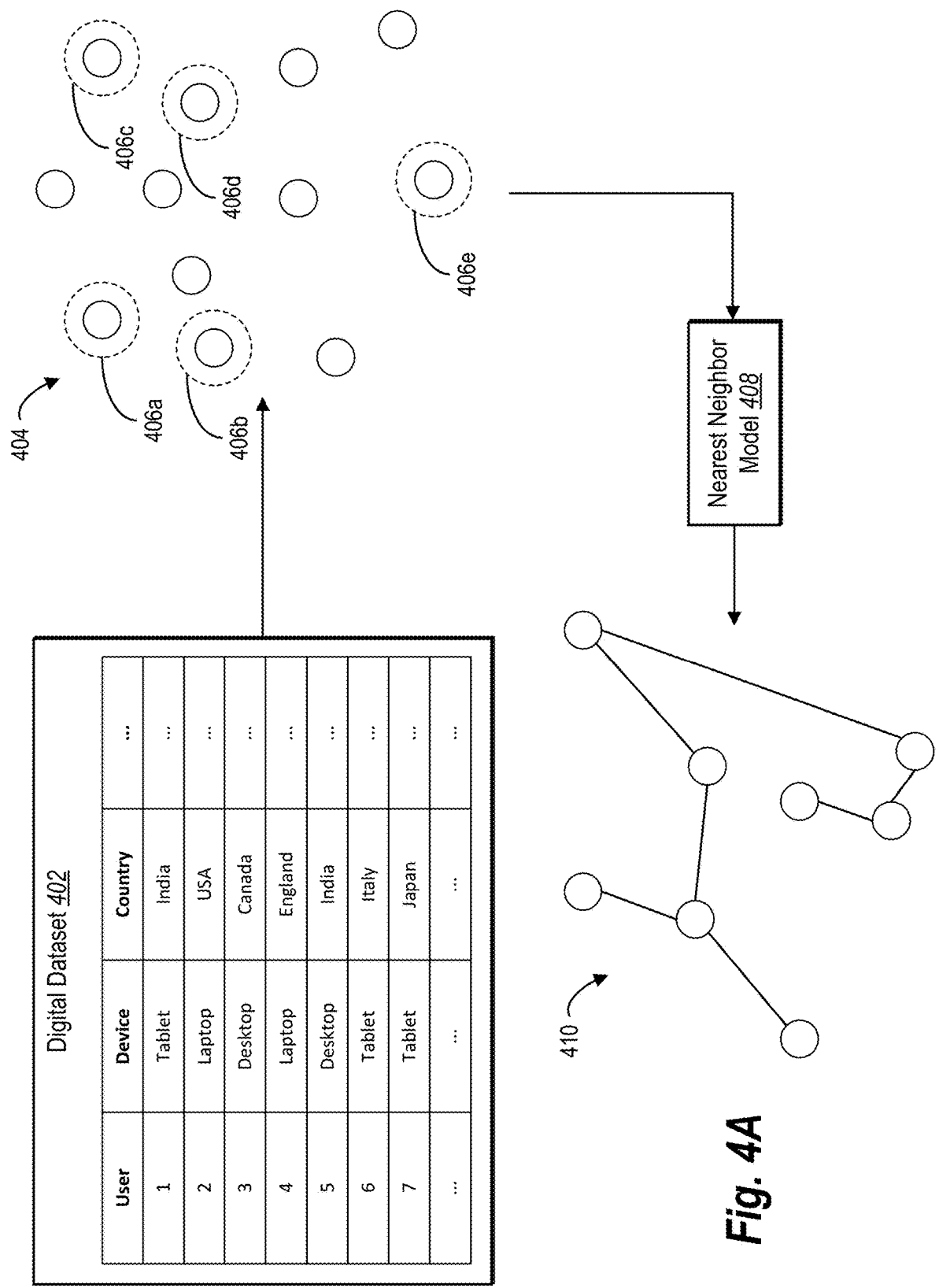

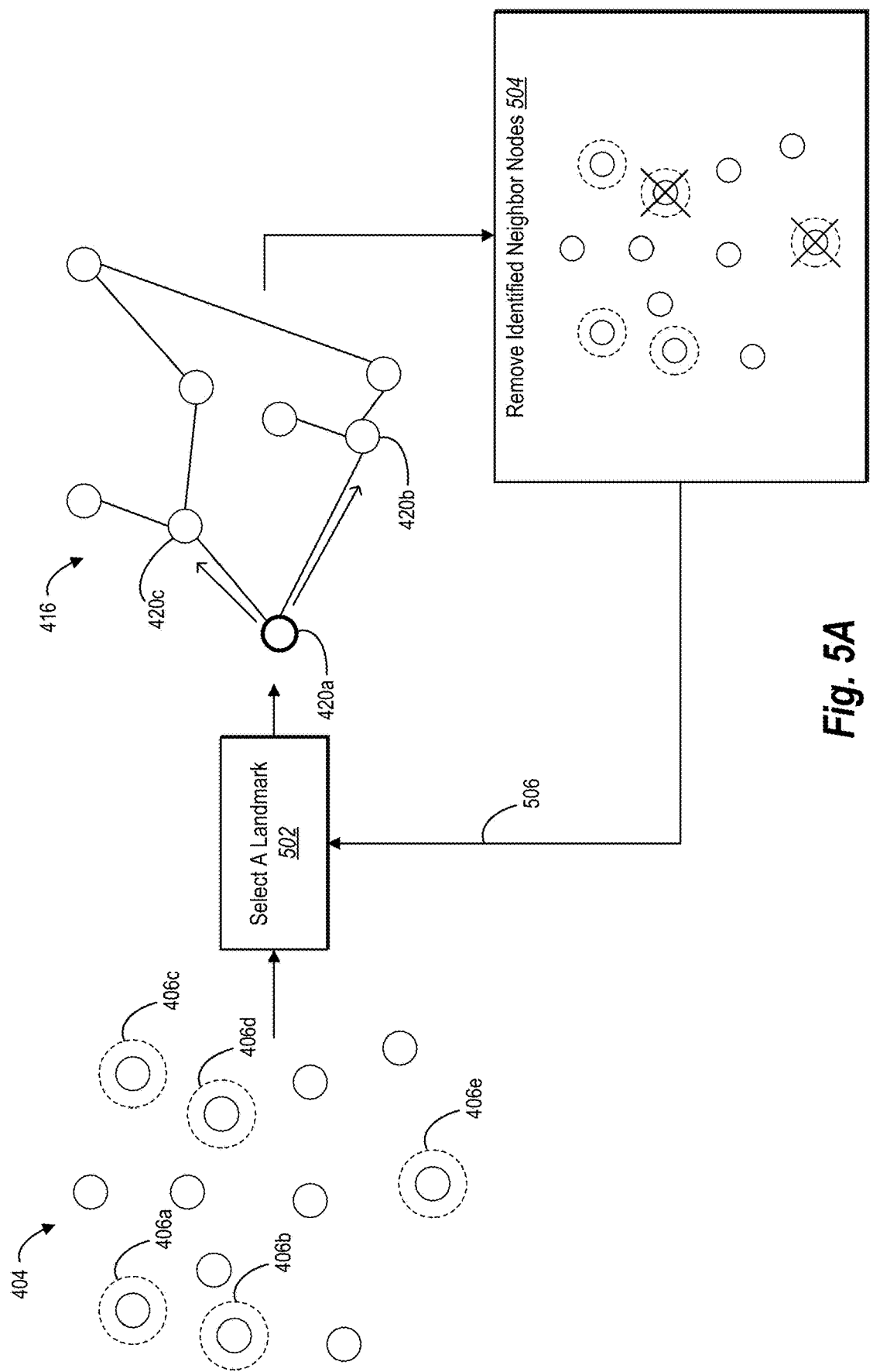

| Dataset | ShapeVis | Mapper (UMAP) | Mapper (LargeVis) | Mapper (t-SNE) |
|---|---|---|---|---|
| MNIST | 483.01 | 217.19 | 679.67 | 723.33 |
| FMNIST | 340.09 | 200.97 | 603.43 | 543.69 |
| Word Vectors | 1796.12 | 3116.14 | 5880.67 | NA |
| LiveJournal | 3351.24 | 3729.32 | 13804.14 | NA |

*Fig. 14*

| Dataset | t-SNE (Multi-core) | LargeVis | UMAP | Mapper (UMAP) | ShapeVis |
|---|---|---|---|---|---|
| 50-k | 247.49 | 322.56 | 80.70 | 88.9 | 61.41 |
| 400-k | 4966.00 | 1624.74 | 973.98 | 1040.66 | 520.58 |
| 1M | Time Out | Time Out | 2688.49 | 2814.55 | 715.56 |
| 2M | Time Out | Time Out | 3763.76 | 4360.91 | 1814.339 |
| 5M | Time Out | Time Out | Memory Overflow | Memory Overflow | 3649.487 |

Fig. 15

GENERATING A DATA VISUALIZATION GRAPH UTILIZING MODULARITY-BASED MANIFOLD TEARING

CROSS-REFERENCE TO RELATED APPLICATIONS

The present application is a continuation of U.S. application Ser. No. 16/850,677, filed on Apr. 16, 2020. The aforementioned application is hereby incorporated by reference in its entirety.

BACKGROUND

Recent years have seen significant advancement in hardware and software platforms that analyze digital datasets to provide various insights. For example, many conventional systems can analyze a digital dataset to determine structures of the digital dataset that provide insights regarding the relationships among particular digital data points as well as groups of digital data points represented therein. Such systems can often further generate a graphical representation of the digital dataset that illustrates the global structure as well as the more specific local structures associated with the digital dataset.

Despite these advances, however, conventional visualization generation systems often suffer from several technological shortcomings that result in inaccurate, inefficient, and inflexible operation. For example, conventional visualization generation systems are often inaccurate in that they fail to accurately determine the structures associated with a digital dataset. To illustrate, conventional systems often employ one of various dimensionality reduction models—such as a uniform manifold approximation and projection (UMAP) model or a t-distribution stochastic neighbor embedding (t-SNE) model—to transform high-dimensional data into a low-dimensional representation. However, by compressing a large number of dimensions down to a few, these models typically suffer from projection losses, which can result in points that are separated in high-dimensional space appearing in the same neighborhood in the lower-dimensional projection. Thus, these conventional systems often provide inaccurate visual representations of the global and local structures associated with a digital dataset.

In addition to accuracy concerns, conventional visualization generation systems can also operate inefficiently. Indeed, dimensionality reduction models are often computationally demanding. Thus, conventional systems employing such models typically require significant computing resources (e.g., memory and processing time and power) in order to provide the structures of a digital dataset. Some conventional systems employ models-such as the graph-based compression technique known as the mapper algorithm—to alleviate various problems associated with dimensionality reduction models. Though it provides improvement in some areas, the mapper algorithm typically requires use of a filter function—often taking the form of a dimensionality reduction model—in order to achieve the end visualization. Thus, conventional systems employing the mapper algorithm may still suffer from significant computational demands. Such conventional systems can suffer further inefficiencies due to the parameter-tuning requirements of the mapper algorithm as well. Indeed, conventional systems can require significant user interaction, time, and corresponding computer resources to analyze digital data volumes.

In addition to problems with inaccuracy and inflexibility, conventional visualization generation systems can also operate inflexibly. For example, due to the computational demands of dimensionality reduction models, conventional systems employing such models are often incapable of flexibly adapting operation to large datasets. Indeed, such conventional systems are typically limited to operating on digital datasets that include a few hundred thousand digital data points or less. Further, such models often fail to flexibly adapt to analyzing datasets associated with high dimensional data.

These, along with additional problems and issues, exist with regard to conventional visualization generation systems.

SUMMARY

One or more embodiments described herein provide benefits and/or solve one or more of the foregoing or other problems in the art with systems, methods, and non-transitory computer-readable media that utilize landmark data points and modularity-based manifold tearing to process large-scale and high-dimensional digital data volumes and generate a compressed, interactive visual shape representation. In particular, the disclosed systems can generate interactive visual shape representations of connected communities from large data repositories that capture small-neighborhood relationships and topological properties of the underlying digital data. Based on user interaction with user interfaces portraying these interactive visual shape representations, the disclosed systems can efficiently and flexibly explore large-scale and high-dimensional data volumes. For example, based on user interaction, the disclosed systems can explore a large digital dataset by generating and displaying detailed sub-communities within the data repository, visual summaries of common traits or features within portions of the digital dataset, and other analytical user interface elements. Indeed, in one or more embodiments, the disclosed systems provide hierarchical interactive shape representations by first creating covers that capture the global structure of the data and, based on user interaction with selected segments, fine-tune the scale of covers to show lower level information present in that region of the data volume.

Furthermore, as mentioned, the disclosed systems generate more accurate visual shape representations relative to conventional systems by utilizing landmark data points and modularity-based manifold tearing. For example, in one or more embodiments, the disclosed systems generate visual shape representations based on one or more network graphs generated from the digital data. In particular, the disclosed systems can construct an augmented nearest neighbor network graph over a data manifold that approximates a 1-witness complex on a sampled subset of the digital data. The disclosed systems can further select landmarks from the sampled subset that segment the network graph and then compress the segmented network graph using induced maps from a community detection algorithm. Additionally, the disclosed systems can generate a spanning network graph that includes the nodes of the induced network graph resulting from the community detection algorithm and includes edges of the induced network graph (based on the modularities of those edges). The disclosed systems can generate a visual representation of the digital dataset using the spanning network graph. In this manner, the disclosed systems can flexibly and efficiently generate visual shape representations that accurately reflect the global and local structures of large-scale and high-dimensional digital data volumes.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 4A illustrates a diagram for generating a nearest neighbor network graph in accordance with one or more embodiments;

FIG. 5A illustrates a diagram for selecting landmarks in accordance with one or more embodiments;

FIG. 14 illustrates a table reflecting further experimental results regarding the effectiveness of the visualization generation system in accordance with one or more embodiments;

FIG. 15 illustrates another table reflecting further experimental results regarding the effectiveness of the visualization generation system in accordance with one or more embodiments;

DETAILED DESCRIPTION

Figure 1:
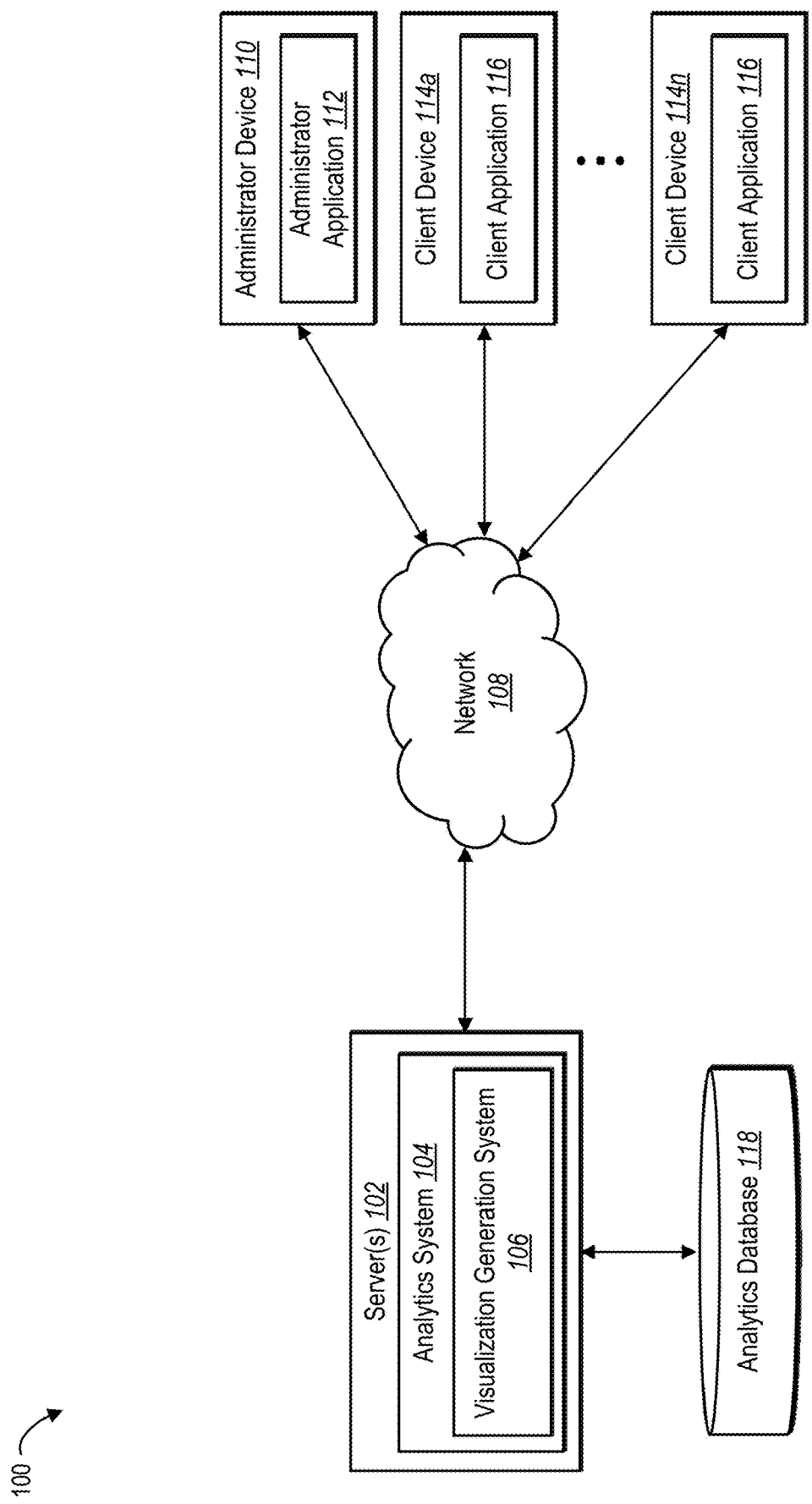
FIG. 1 illustrates an example environment in which a visualization generation system can operate in accordance with one or more embodiments.

One or more embodiments described herein include a visualization generation system for utilizing a nearest neighbor graph construction on landmark points together with modularity-based manifold tearing to process large-scale, high-dimensional digital data volumes and generate interactive, visual shape representations. More specifically, the visualization generation system can generate interactive visual shape representations that capture the shape and topology of large data repositories. For example, the visualization generation system can present interactive visual shape representations representing communities and edges of the underlying dataset in a user interface. Based on interaction with user interfaces portraying these interactive visual shape representations, the visualization generation system can interactively explore a high-dimensional data volume by presenting sub-communities, statistical visual summaries of selected portions, and other analytical user interface elements. The visualization generation system can thus transform large, unwieldy data volumes into efficient, interactive shape representations reflecting tunable covers of the data structure at different scales.

In some embodiments, the visualization generation system generates accurate visual shape representations by utilizing a nearest neighbor network graph on landmark points from the underlying digital dataset and summarizing this graph by finding covers through community detection and modularity-based manifold tearing. For instance, the visualization generation system can generate a k-nearest neighbor network graph based on landmarks chosen from a sample of digital data points and a 1-witness complex approximation of the sampled data points. The visualization generation system can further summarize the network graph by finding covers of the network graph and edges between intersecting covers through community detection to approximate the topological structure of the network graph. Based on the modularities of the edges of the summarized network graph, the visualization generation system can generate a spanning network graph that includes edges to increase connectivity and complete loops of edges. The visualization generation system can generate a visual representation of the digital dataset using the spanning network graph. In one or more embodiments, the visual representation interactively modifies the visual representation by modifying the scale of the community cover, providing various levels of detail on the digital dataset in response to user interactions.

To provide an illustration, in one or more embodiments, the visualization generation system processes a digital dataset utilizing a nearest neighbor model and random walks to generate a landmark network graph comprising a plurality of landmarks and edges. The visualization generation system determines, based on the edges, a partition of the landmark network graph comprising communities of landmark groups from the landmarks and a plurality of community edges. The visualization generation system further generates a spanning network graph comprising the communities from the partition of the landmark network graph. In particular, the visualization generation system can generate the spanning network graph by ranking the plurality of community edges of the partition of the landmark network based on modularities of the plurality of community edges; and adding a first subset of community edges to the spanning network graph based on the ranking and a measure of connectivity of the first subset of community edges relative to the communities. Additionally, the visualization generation system generates a loop-augmented spanning network graph by adding a second subset of community edges that complete community loops within the spanning network graph. From the loop-augmented spanning network graph, the visualization generation system can generate an interactive visual shape representation of the digital dataset for display on a client device.

As just mentioned, in one or more embodiments, the visualization generation system generates a landmark network graph utilizing a nearest neighbor model. In particular, the visualization generation system can generate the landmark network graph based on an augmented nearest neighbor network graph. To illustrate, the visualization generation system can sample a subset of digital data points from a digital dataset and generate a nearest neighbor network graph based on the sampled subset utilizing a k-nearest neighbor model. The visualization generation system can generate the augmented nearest neighbor graph by applying a witness complex model to a remaining subset of digital data points (e.g., unsampled digital data points from the digital dataset) to connect pairs of unconnected nodes within the nearest neighbor network graph.

In addition, the visualization generation system can sample a plurality of nodes of the augmented nearest neighbor network graph to determine landmarks of the digital dataset. The visualization generation system can further determine relationships between the landmarks by performing a plurality of random walks on the augmented nearest neighbor network graph. Specifically, the visualization generation system can utilize a Finite Markov Chain (FMC) to weight edges and encode similarities between landmarks. Accordingly, the visualization generation system can generate the landmark network graph to include the landmarks and edges between the landmarks having edge strengths corresponding to the underlying relationships within the digital data volume.

As further mentioned above, in one or more embodiments, the visualization generation system determines a partition of the landmark network graph comprising communities of landmark groups and a plurality of community edges. For example, the visualization generation system can apply a community detection model to the landmark network graph to determine the partition of the landmark network graph. In one or more embodiments, the community detection model generates a plurality of partitions of the landmark network graph and the visualization generation system selections one of the generated partitions.

In one or more embodiments, the visualization generation system further generates a spanning network graph based on the partition of the landmark network graph. Indeed, the spanning network graph can include the communities of landmark groups from the partition of the landmark network graph. The visualization generation system can add, to the spanning network graph, a subset of the community edges from the partition of the landmark network graph using a modularity-based ranking of the community edges. The visualization generation system can further add the subset of community edges based on a measure of connectivity of the first subset of community edges relative to the communities.

The visualization generation system can further generate a loop-augmented spanning network graph by adding, to the spanning network graph, an additional subset of community edges from the partition of the landmark network graph. In particular, the visualization generation system can add the additional subset of community edges to complete community loops within the spanning network graph. In one or more embodiments, the visualization generation system adds a community edge based on whether or not the community edge completes a community loop having at least a predetermined number of community edges.

Additionally, as mentioned above, in one or more embodiments, the visualization generation system generates an interactive visual shape representation of the digital dataset from the loop-augmented spanning network graph. Indeed, the interactive visual shape representation can include a plurality of nodes and edges that capture the communities of landmark groups and community edges added to the loop-augmented spanning network graph. In some embodiments, the visualization generation system provides the interactive visual shape representation for display on a client device. In response to a user interaction with one or more communities (e.g., nodes) of the interactive visual shape representation, the visualization generation system can provide various additional details related to the digital dataset. As one example, in response to a user interaction with a selected community of the interactive visual shape representation, the visualization generation system can present visual representations of sub-communities corresponding to the selected community and a plurality of edges between the visual representations of the sub-communities.

The visualization generation system provides several advantages over conventional systems. For example, the visualization generation system can operate more accurately than conventional systems. In particular, by capturing low-level relationships between digital data points (e.g., via the nearest neighbor network graph and landmark network graph) and leveraging these low-level relationships when generating abstractions of the data structure (e.g., via the partition of the landmark network graph and the loop-augmented spanning network graph), the visualization generation system provides a more accurate representation of the global and local structures associated with a digital dataset.

Additionally, the visualization generation system can operate more efficiently than conventional systems. Indeed, the interactive visual shape representation generated by the visualization generation system is more concise compared to the visualizations generated by many conventional systems. Accordingly, the visualization generation system reduces the amount of memory and computing time and power used in generating the interactive visual shape representation. In addition, the visualization generation system can improve efficiency by providing user interfaces for exploring high-volume digital datasets with reduced user interaction and computer resources. Indeed, with only a handful of user interactions, the visualization generation system can generate shape representations of underlying digital data volumes reflecting millions (or billions) of data points, modify shape representations at different levels of detail to explore additional layers of the underlying data volume, generate statistical visual summaries that reflect traits and characteristics of different communities, and identify significant trends or features within the digital dataset (which would take excessive time and user interactions to identify through conventional systems).

Further, the visualization generation system can improve flexibility. Indeed, by reducing the computational demands of generating the interactive visual shape representation, the visualization generation system can generate visualizations for larger datasets when compared to many conventional systems. Further, the visualization generation system can generate visualizations for digital datasets having a higher dimensionality than those processed by many conventional systems.

As illustrated by the foregoing discussion, the present disclosure utilizes a variety of terms to describe features and benefits of the visualization generation system. Additional detail is now provided regarding the meaning of these terms. For example, as used herein, the term "digital dataset" refers to a collection of digital information. In particular, a digital dataset can refer to a collection of digital data points reflecting a variety of features or characteristics. For example, a digital dataset can include digital data points that reflect traits of particular users, events, entities, or objects. As mentioned, digital datasets can include large and high-dimensional data volumes. For example, a digital datasets can reflect thousands of traits for a single profile of a user or client device and can further record such traits for millions of different profiles.

Additionally, as used herein, the term "digital data point" refers to an instance of digital data. In particular, a digital data point can refer to a discrete and individually identifiable element of digital data from a digital dataset. A digital data point can correspond to various types of digital data. To illustrate, a digital data point can correspond to a user profile, a user trait, an item, or an event (e.g., an impression, a conversion, etc.).

Further, as used herein, the term "landmark" refers to a sampled digital data point. In particular, a landmark refers to a digital data point selected from among a group of digital data points to represent the group of digital data points. A landmark can include a digital data point sampled at random, a digital data point sampled using a non-random process, or a digital data point sampled using a non-random process that incorporates some degree of randomness.

As used herein, the term "data characteristics" refers to a trait, feature, or characteristic reflected by digital information. In particular, a data characteristic can refer to an identifiable trait or attribute represented by digital data within a digital dataset (e.g., a trait or attribute associated with one or more digital data points of a digital dataset). For example, a data characteristic can include a user trait, an item feature or attribute, or a feature of an event (e.g., a time of an impression, revenue associated with a conversion, etc.).

Additionally, as used herein, the term "user profile" refers to digital data associated with a particular user or user device. In particular, a user profile can refer to a description of a user identity or, in other words, a collection details associated with a particular user or user device. For example, a user profile can include a collection of one or more user traits associated with a particular user. Relatedly, as used herein, the term "user trait" refers to a characteristic or attribute of a user. For example, a user trait can include, but is not limited to, an attribute or characteristic of the user itself (e.g., a location, interest, gender, or age of the user), a characteristic of a device associated with the user (e.g., device model, display resolution, processor, memory capacity, etc.), or a characteristic of activity associated with the user (e.g., a time of last login, social networks associated with the user, last item purchased by the user, etc.).

As used herein, the term "network graph" refers to a class of graph that includes a plurality of nodes connected via edges. In particular, a network graph can refer to a representation of digital data where a node corresponds to a digital data point or group of digital data points and an edge connecting a pair of nodes represents a relationship, similarity, or overlap between those nodes. For example, a network graph can include, but is not limited to, a nearest neighbor network graph, a landmark network graph, or a spanning network graph. The shape of a network graph can represent the geometric and topological structure of the underlying digital data. In some embodiments, the network graph illustrates the entirety of a digital dataset (e.g., having a node for each digital data point included therein). In some instances, however, a network graph presents a representative portion of the digital dataset (e.g., a sampled subset of the digital data points). In some instances, an edge of a network graph is associated with an edge strength. As used herein, the term "edge strength" refers to an indication of a strength or weight of the relationship, similarity, or overlap between two nodes connected by the corresponding edge. For example, an edge strength can include a numerical value that quantifies the strength (e.g., with a higher value corresponding to a stronger relationship).

Additionally, as used herein, the term "partition" (or "partition of a network graph") refers to a division of a network graph into various portions or sub-graphs. In particular, a partition can refer to a grouping of nodes represented in a network graph resulting in communities that are connected together based on the connections between their respective constituent nodes. In some instances, the visualization generation system represents a partition as a network graph itself where a node of the partition represents a community and an edge between a pair of nodes represents the edges between the member nodes of each community.

As used herein, the term "community" refers to a group of nodes. In particular, a community can refer to a group of similar, related, or overlapping nodes. For example, a community can include a group of nodes within a partition of a network graph. Additionally, as used herein, the term "community edge" refers to an edge that connects communities. Further, as used herein, the term "community loop" refers to a closed loop of communities connected by community edges.

Additionally, as used herein, the term "modularity" refers to a measure of strength of connection for a group of nodes. In particular, modularity can refer to a metric that indicates the strength of connections (e.g., edges) within a group of nodes compared to a strength of connections (e.g., edges) between that group of nodes and other groups of nodes. For example, modularity can include a ratio of the edge strengths between nodes within a community with respect to the edge strengths between the community and other communities. In some instances, an edge can be associated with a modularity. For example, an edge can be associated with a modularity based on the modularities of one or both of the groups of nodes connected by the edge.

Further, as used herein, the term "connectivity" (or "measure of connectivity") refers to a measure of how the nodes of a network graph are connected. In particular, connectivity can refer to a measure of how many nodes of a network graph are connected to at least one other node within the network graph.

Additionally, as used herein, the term "community detection model" refers to a community algorithm or model that determines partitions of network graphs. In particular, a community detection model can refer to a computer algorithm that identifies communities of nodes based on a measure of a relationship, similarity, or overlap associated with the nodes. For example, a community detection model can include a computer algorithm that identifies communities of nodes based on a measure of modularity. Aa community detection algorithm can associate a node with a particular community based on increasing a modularity associated with that particular community or based on increasing an overall modularity associated with the partition of the network graph. A community detection model can include, but is not limited to, a Louvain-based community detection model or a Leiden-based community detection model.

Further, as used herein, the term "nearest neighbor network graph" refers to a network graph where nodes are connected to their nearest neighbor(s) (e.g., a network graph generated utilizing a nearest neighbor algorithm). In particular, a nearest neighbor network graph can refer to a network graph generated by utilizing a nearest neighbor graph to connect a first node to a second node if the first node is at least one of the nearest neighbors of the second node in some space (e.g., a feature space) in which the nodes exist. For example, a nearest neighbor network graph can include a k-nearest neighbor network graph where k can take on a value of one or more.

Relatedly, as used herein, the term "nearest neighbor model" (or "neural neighbor algorithm") refers to a computer algorithm or model that identifies close (or near) examples in a feature space. In particular, a nearest neighbor model can refer to a computer algorithm that determines, for a given node (or data point), the nearest neighbor node(s) of that node (and connects the node to its nearest neighbor node(s) accordingly). In one or more embodiments, a nearest neighbor model includes a k-nearest neighbor model. In particular, a nearest neighbor model can connect a node existing in some space (e.g., a feature space) to its k nearest neighbors in that space, where k can take on a value of one or more.

Relatedly, as used herein, the term "augmented nearest neighbor network graph" refers to a nearest neighbor network graph that has been modified or augmented (e.g., by applying a witness complex model). In particular, an augmented nearest neighbor network graph can refer to a nearest neighbor network graph having one or more modifications applied after generation of the nearest neighbor network graph by a nearest neighbor model. For example, an augmented nearest neighbor network graph can refer to a nearest neighbor network graph having additional edges between one or more pairs of nodes (based on applying a witness complex model).

Additionally, as used herein, the term "landmark network graph" refers to a network graph that includes landmarks (e.g., landmarks selected from nodes or digital datapoints of the underlying dataset). In particular, a landmark network graph can include a network graph having nodes corresponding to selected landmarks together with edges (and edge weights) reflecting relationships, similarities, or overlaps between the landmarks. As used herein, the term "partitioned landmark network graph" refers to a partition of a landmark network graph.

As used herein, the term "random walk" refers to a process for traversing a network graph that includes a plurality of interconnected nodes. In particular, a temporal random walk can refer to a process of traversing the nodes of a network graph in a random or semi-random manner based on the edges connecting those nodes. In one or more embodiments, the visualization generation system utilizes a Finite Markov Chain to model random traversal amongst the nodes of a network graph.

As used herein, the term "interactive visual shape representation" refers to an interactive graphical element that represents digital data. In particular, an interactive visual shape representation can refer to an interactive visualization representing a network graph of a digital dataset. In some instances, an interactive visual shape representation can provide a direct visual representation of the underlying network graph (e.g., without any visual modifications). In other instances, however, an interactive visual shape representation provides a modified visual representation of the underlying network graph (e.g., with nodes having different sizes and/or colors based on the underlying digital data represented by those nodes). In many cases, however, an interactive visual shape representation provides the shape of the underlying network graph (i.e., the shape of the digital dataset upon which the network graph is based) whether the visual representation is direct or modified. Further, as will be discussed in more detail below, the visualization generation system can execute one or more operations based on user interaction with the interactive visual shape representation.

Additionally, as used herein, the term "statistical visual summary" (or "statistical visual summary of digital data") refers to a visual summary of digital data of a digital dataset. In particular, a statistical visual summary can refer to a visual collection of statistical highlights or a summarized statistical description of data characteristics associated with digital data. For example, a statistical visual summary can include a summarized statistical description of digital data points (e.g., landmarks) associated with a selected community from an interactive visual shape representation of a digital dataset.

Additional detail regarding the visualization generation system will now be provided with reference to the figures. For example, FIG. 1 illustrates a schematic diagram of an exemplary system environment ("environment") 100 in which a visualization generation system 106 can be implemented. As illustrated in FIG. 1, the environment 100 includes a server(s) 102, a network 108, an administrator device 110, client devices 114a-114n, and an analytics database 118.

Although the environment 100 of FIG. 1 is depicted as having a particular number of components, the environment 100 can have any number of additional or alternative components (e.g., any number of servers, administrator devices, client devices, analytics databases, or other components in communication with the visualization generation system 106 via the network 108). Similarly, although FIG. 1 illustrates a particular arrangement of the server(s) 102, the network 108, the administrator device 110, the client devices 114a-114n, and the analytics database 118, various additional arrangements are possible.

The server(s) 102, the network 108, the administrator device 110, the client devices 114a-114n, and the analytics database 118 may be communicatively coupled with each other either directly or indirectly (e.g., through the network 108 discussed in greater detail below in relation to FIG. 19). Moreover, the server(s) 102, the administrator device 110, and the client devices 114*a*-114*n* may include a variety of computing devices (including one or more computing devices as discussed in greater detail with relation to FIG. 19).

As mentioned above, the environment 100 includes the server(s) 102. The server(s) 102 can generate, store, receive, and/or transmit digital data, including interactive visual shape representations of digital datasets. For example, the server(s) 102 can receive digital data from a client device (e.g., one of the client devices 114*a*-114*n*). The server(s) 102 can generate or add to a user profile for the user of the client device utilizing the received digital data. Further, the server(s) 102 can transmit an interactive visual shape representation of a digital dataset that includes digital data representing a plurality of user profiles to the administrator device 110. In one or more embodiments, the server(s) 102 comprises a data server. The server(s) 102 can also comprise a communication server or a web-hosting server.

As shown in FIG. 1, the server(s) 102 includes an analytics system 104. In particular, the analytics system 104 can collect, manage, and utilize analytics data. For example, the analytics system 104 can collect analytics data related to user profiles. The analytics system 104 can collect the analytics data in a variety of ways. For example, in one or more embodiments, the analytics system 104 causes the server(s) 102 to track digital data related to user profiles and report the tracked digital data for storage on a database (e.g., the analytics database 118). In one or more embodiments, the analytics system 104 receives the digital data directly from the client devices 114*a*-114*n* via data or generated stored thereon.

Additionally, the server(s) 102 include the visualization generation system 106. In particular, in one or more embodiments, the visualization generation system 106 utilizes the server(s) 102 to generate interactive visual shape representations of digital datasets. For example, the visualization generation system 106 can utilize the server(s) 102 to generate a compressed network graph representation of a digital dataset and generate an interactive visual shape representation from the compressed network graph representation.

For example, in one or more embodiments, the visualization generation system 106, via the server(s) 102, processes a digital dataset utilizing a nearest neighbor algorithm and random walks to generate a landmark network graph comprising a plurality of landmarks and edges. The visualization generation system 106, via the server(s) 102, further determines, based on the edges of the landmark network graph, a partition of the landmark network graph comprising communities of landmark groups from the landmarks and a plurality of community edges. Via the server(s) 102, the visualization generation system 106 generates a spanning network graph comprising the communities from the partition of the landmark network graph by adding a first subset of community edges to the spanning network graph based on a ranking of the community edges based on modularity and a measure of connectivity of the first subset of community edges relative to the communities. Further, the visualization generation system 106, via the server(s) 102, generates a loop-augmented spanning network graph by adding a second subset of community edges that complete community loops within the spanning network graph. Via the server(s) 102, the visualization generation system 106 generates an interactive visual shape representation of the digital dataset from the loop-augmented spanning network graph for display on a client device.

In one or more embodiments, the analytics database 118 stores digital data related to user profiles. For example, the analytics database 118 can store digital data representing one or more user traits associated with a user. The analytics database 118 can further store digital data related to items and/or events. Though FIG. 1 illustrates the analytics database 118 as a distinct component, one or more embodiments include the analytics database 118 as a component of the server(s) 102, the analytics system 104, or the visualization generation system 106.

In one or more embodiments, the administrator device 110 includes a computing device that can receive and display digital data and/or interactive visual shape representations of digital datasets. For example, the administrator device 110 can include a smartphone, a tablet, a desktop computer, a laptop computer, or another electronic device. The administrator device 110 can include one or more applications (e.g., the administrator application 112) that can receive and display digital information, such as interactive visual shape representations of digital datasets. For example, the administrator application 112 can include a software application installed on the administrator device 110. Additionally, or alternatively, the administrator application 112 can include a software application hosted on the server(s) 102, which may be accessed by the administrator device 110 through another application, such as a web browser.

In one or more embodiments, the client devices 114*a*-114*n* include computing devices that can cause the collection of digital data, such as digital data that can be used as part of a user profile. For example, the client devices 114*a*-114*n* can include smartphones, tablets, desktop computers, laptop computers, head-mounted-display devices, or other electronic devices. The client devices 114*a*-114*n* can include one or more applications (e.g., the client application 116) that can cause the collection of digital data, such as digital data that can be used as part of a user profile. For example, the client application 116 can include a software application installed on the client devices 114*a*-114*n*. Additionally, or alternatively, the client application 116 can include a software application hosted on the server(s) 102, which may be accessed by the client devices 114*a*-114*n* through another application, such as a web browser.

The visualization generation system 106 can be implemented in whole, or in part, by the individual elements of the environment 100. Indeed, although FIG. 1 illustrates the visualization generation system 106 implemented with regard to the server(s) 102, different components of the visualization generation system 106 can be implemented by a variety of devices within the environment 100. For example, one or more (or all) components of the visualization generation system 106 can be implemented by a different computing device (e.g., one of the client devices 114*a*-114*n*) or a separate server from the server(s) 102 hosting the analytics system 104. Example components of the visualization generation system 106 will be described below with regard to FIG. 17.

Figure 2:
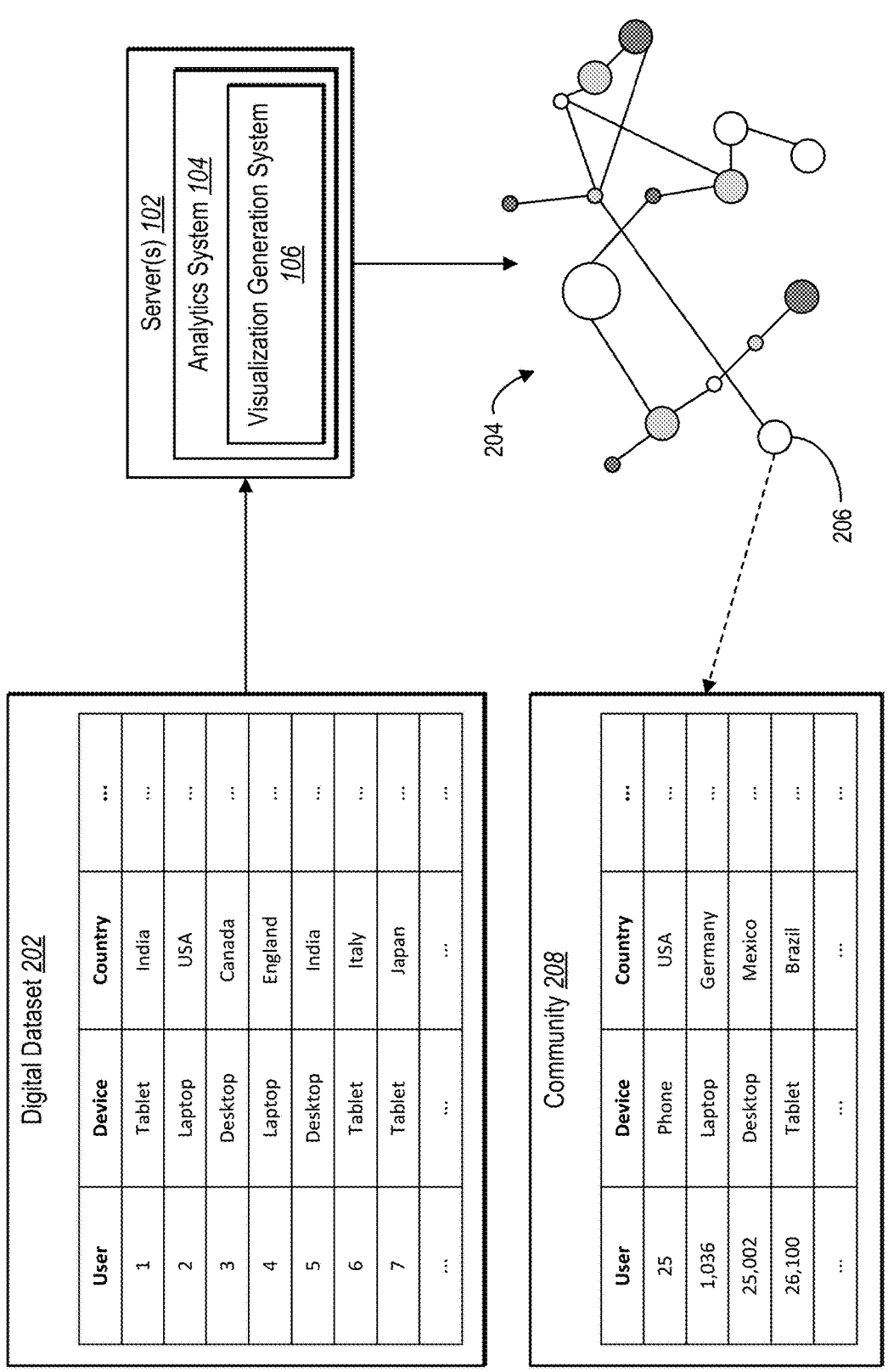
FIG. 2 illustrates a block diagram of a visualization generation system generating an interactive visual shape representation in accordance with one or more embodiments.

As mentioned above, the visualization generation system 106 can generate an interactive visual shape representation of a digital dataset. FIG. 2 illustrates a block diagram of the visualization generation system 106 generating an interactive visual shape representation in accordance with one or more embodiments.

As shown in FIG. 2, the visualization generation system 106 identifies a digital dataset 202. In one or more embodiments, the visualization generation system 106 identifies the digital dataset 202 by receiving the digital dataset 202 from a computing device (e.g., a third-party server). In some embodiments, however, the visualization generation system 106 identifies the digital dataset 202 by accessing a database storing digital data. For example, the visualization generation system 106 can receive digital data from one or more client devices and store the digital data within a database. The visualization generation system 106 can access the database and retrieve the digital dataset 202. In some embodiments, an external device or system stores the digital data corresponding to the digital dataset 202 within a database for access by the visualization generation system 106.

In some embodiments, the digital dataset 202 includes digital data associated with user profiles. For example, the digital dataset 202 can include digital data points, each digital data point corresponding to a user profile of a particular user. Though the discussion around FIG. 2 and many of the subsequent figures describes processing digital datasets that include digital data corresponding to user profiles, it should be noted that the visualization generation system 106 is not so limited. Indeed, the visualization generation system 106 can process digital datasets storing various types of digital data. For example, the visualization generation system 106 can process digital datasets that include digital data corresponding to items (e.g., products for sale, clothing items, etc.) or events (e.g., actions taken by a user via a client device).

As further shown in FIG. 2, the visualization generation system 106 processes the digital dataset 202 to generate an interactive visual shape representation 204 of the digital dataset. As will be discussed in more detail below, the interactive visual shape representation 204 represents selected landmarks of the digital dataset 202. More specifically, the nodes of the interactive visual shape representation 204 represent communities of landmark groups—as illustrated by the node 206 representing the community 208. By utilizing selected landmarks to generate the interactive visual shape representation 204, the visualization generation system 106 reduces computational demands required to generate visual representations of digital datasets-especially when processing very large digital datasets—while capturing the structures of those digital datasets. Indeed, as shown in FIG. 2, the interactive visual shape representation 204 represents the overall structure of the digital dataset 202 in a feature space. In one or more embodiments, the visualization generation system 106 provides the interactive visual shape representation 204 for display on a client device. More detail regarding the interactive visual shape representation 204, including the interactivity and various associated visual characteristics, will be discussed in more detail below.

Figure 3:
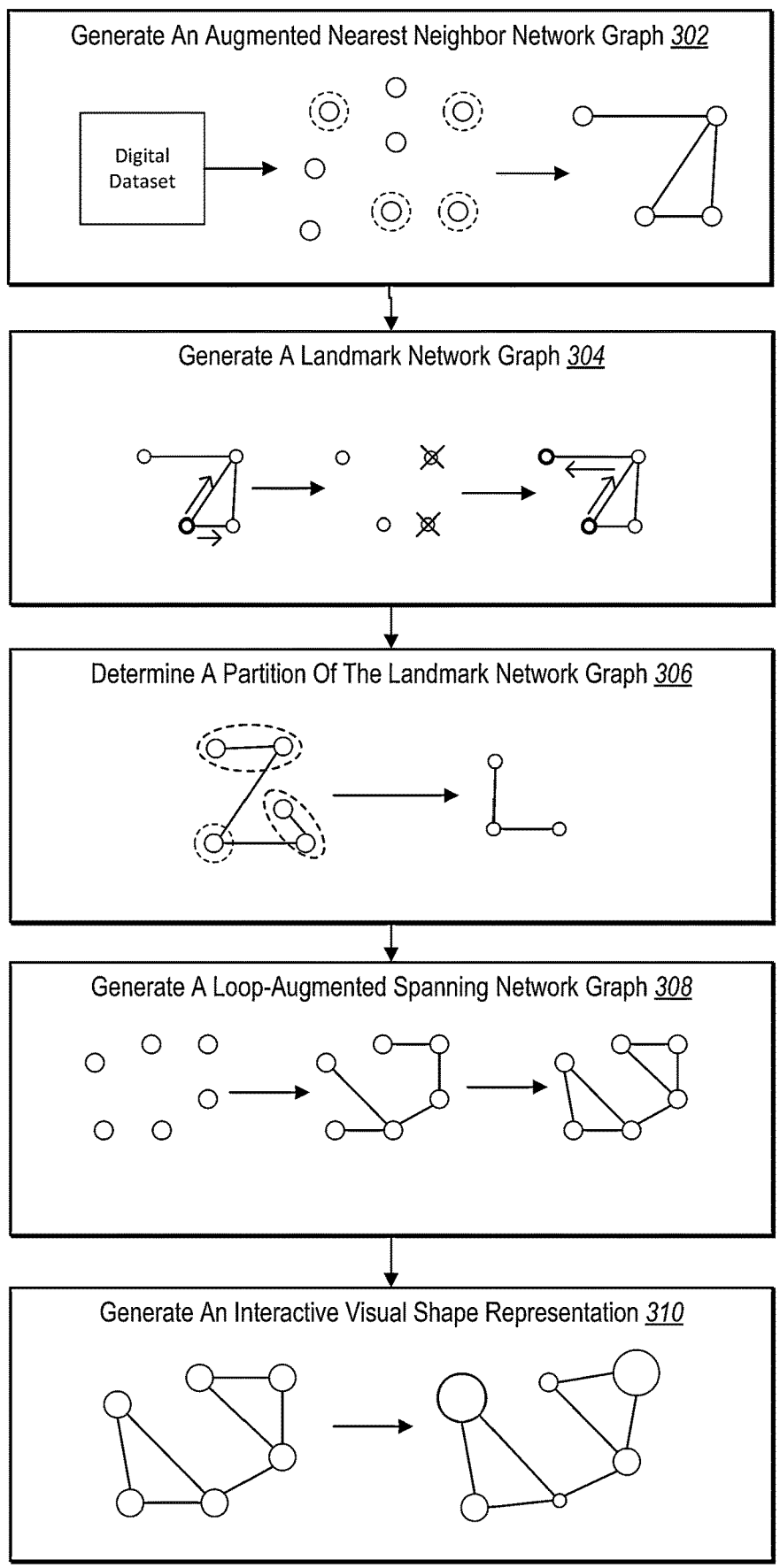
FIG. 3 illustrates an overview of a sequence of steps performed by the visualization generation system to generate an interactive visual shape representation of a digital dataset in accordance with one or more embodiments.

FIG. 3 illustrates an overview of a sequence of acts that the visualization generation system 106 performs for generating an interactive visual shape representation of a digital dataset in accordance with one or more embodiments. Though FIG. 3 illustrates the visualization generation system 106 performing the acts in a particular sequence, the visualization generation system 106 can perform the acts (or additional or fewer acts) in different sequence orders as well.

For instance, as shown in FIG. 3, the visualization generation system 106 performs an act 302 of generating an augmented nearest neighbor network graph. In particular, the visualization generation system 106 can generate a nearest neighbor network graph by applying a k-nearest neighbor algorithm to data points of a digital dataset. The visualization generation system 106 can further modify the nearest neighbor network graph to generate the augmented nearest neighbor network graph. For example, the visualization generation system 106 can apply a witness complex model to augment edges within the nearest neighbor network graph. More detail regarding generating the augmented nearest neighbor network graph will be provided below with reference to FIGS. 4A-4B.

As shown in FIG. 3, the visualization generation system 106 further performs an act 304 of generating a landmark network graph. In particular, the visualization generation system 106 can select landmarks of the digital dataset and determine edges (with corresponding edge strengths) between the landmarks. In one or more embodiments, the visualization generation system 106 generates the landmark network graph based on the augmented nearest neighbor graph by selecting landmarks and then performing random walks on the augmented nearest neighbor network graph to determine edge strengths between the landmarks. More detail regarding generating the landmark network graph will be provided below with reference to FIGS. 5A-5B.

Additionally, as shown in FIG. 3, the visualization generation system 106 performs an act 306 of determining a partition of the landmark network graph. In particular, the visualization generation system 106 can determine a partition of the landmark network graph that includes communities of landmark groups from the landmarks and a plurality of community edges. For example, the visualization generation system 106 can apply a community detection algorithm to cover the landmark network graph with communities. More detail regarding determining a partition of the landmark network graph will be provided below with reference to FIG. 6.

Further, as shown in FIG. 3, the visualization generation system 106 performs an act 308 of generating a loop-augmented spanning network graph. In particular, the visualization generation system 106 can generate a spanning network graph that includes the communities from the partition of the landmark network graph and a subset of community edges from the partition of the landmark network graph. As mentioned above, the visualization generation system can add the subset of community edges based on modularities as a part of a modularity-based manifold tearing process. The visualization generation system 106 can further generate the loop-augmented spanning network graph by adding additional community edges to complete loops within the spanning network graph. More detail regarding generating the loop-augmented spanning network graph will be provided below with reference to FIGS. 7A-7B.

As shown in FIG. 3, the visualization generation system 106 also performs an act 310 of generating an interactive visual shape representation. In particular, the visualization generation system 106 can generate the interactive visual shape representation from the loop-augmented spanning network graph. For example, the visualization generation system 106 can generate an interactive visual shape representation that includes communities and edges from the loop-augmented spanning network graph, where the size and color of the communities provide details regarding the underlying digital dataset. More detail regarding the interactive visual shape representation will be provided below with reference to FIGS. 8-10.

Figure 4B:
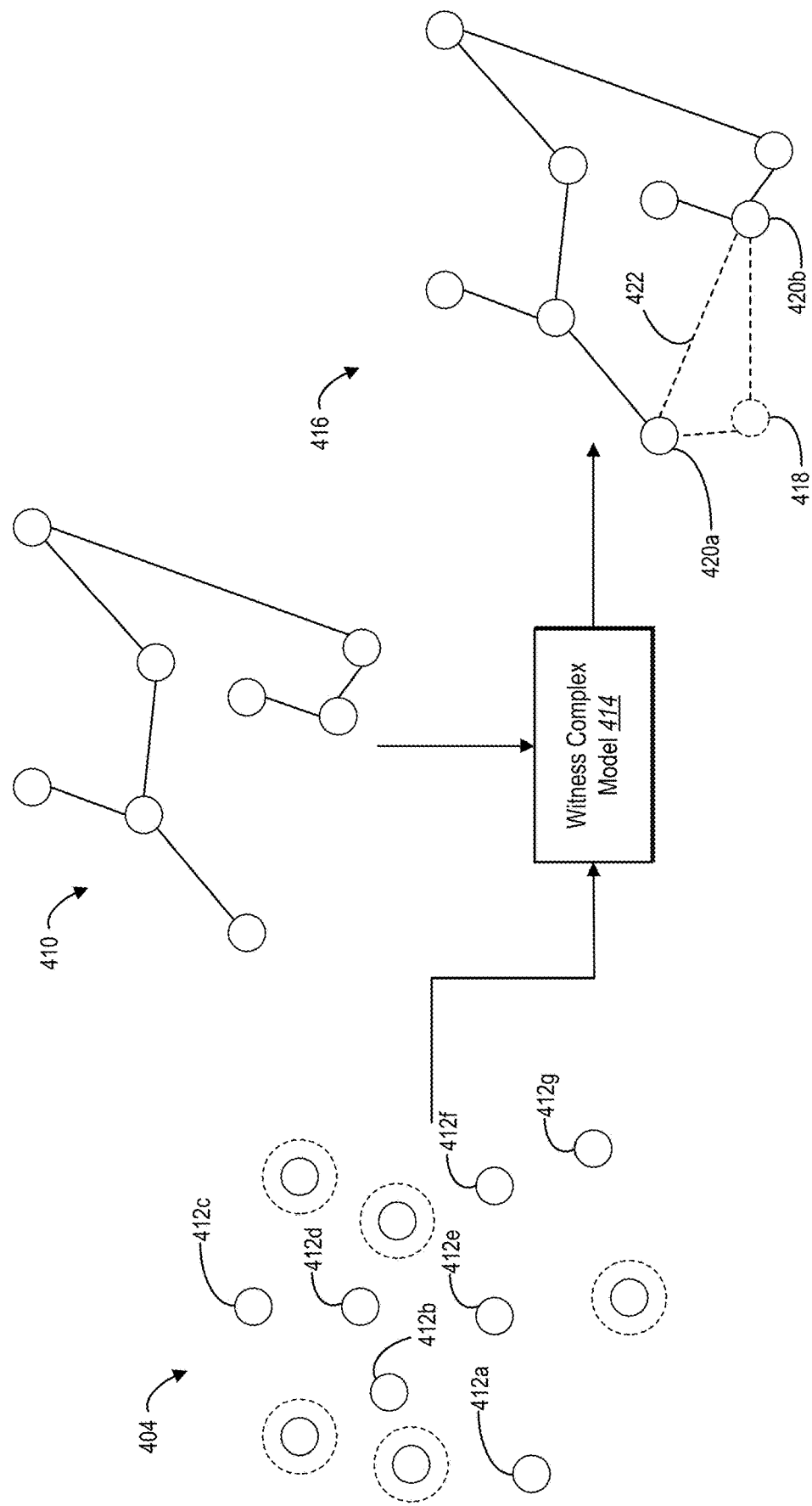
FIG. 4B illustrates a diagram for generating an augmented nearest neighbor network graph in accordance with one or more embodiments.

As previously mentioned, in one or more embodiments, the visualization generation system 106 generates an augmented nearest neighbor network graph based on a digital dataset. FIGS. 4A-4B illustrate diagrams of generating an augmented nearest neighbor network graph in accordance with one or more embodiments.

In particular, FIG. 4A illustrates a diagram of generating a nearest neighbor network graph in accordance with one or more embodiments. As shown in FIG. 4A, the visualization generation system 106 processes a digital dataset 402. In particular, the visualization generation system 106 processes the digital dataset 402 by mapping the digital data points of the digital dataset 402 to a high-dimensional space corresponding to a low-dimensional manifold. The visualization generation system 106 can map the digital data points of the digital dataset 402 onto the low-dimensional manifold using various techniques. For example, in one or more embodiments, the visualization generation system 106 generates embeddings for the digital data points using an embedding algorithm. In some embodiments, the visualization generation system 106 maps the digital data points using a distance measure from a high-dimensional space.

As further shown in FIG. 4A, the visualization generation system 106 samples a subset of digital data points of the digital dataset 402. Indeed, in some instances, the scale of the digital dataset 402 is prohibitively large. Accordingly, the visualization generation system 106 samples from the digital dataset 402 for more manageable processing. In particular, the visualization generation system 106 can sample from the plurality of digital data points 404—shown by the sampled digital data points 406a-406e. In one or more embodiments, however, the visualization generation system 106 samples a subset of digital data points from the digital dataset 402 first and then maps the sampled subset of digital data points onto feature space.

Additionally, as shown in FIG. 4A, the visualization generation system 106 applies a nearest neighbor model 408 to the sampled subset of digital data points. The visualization generation system 106 can utilize the nearest neighbor model 408 to generate the nearest neighbor network graph 410 based on the sampled subset of digital data points. As mentioned above, the nearest neighbor model 408 can include a k-nearest neighbor model. In one or more embodiments, the visualization generation system 106 utilizes a fixed or default value of k for the nearest neighbor model 408. In some embodiments, however, the visualization generation system 106 establishes the value of k used by the nearest neighbor model 408 based on some user input (e.g., input received by an administrator).

In one or more embodiments, the nearest neighbor model 408 generates nearest neighbor network graphs as described by M. Connor and P. Kumar, *Fast Construction Of K-nearest Neighbor Graphs For Point Clouds*, in IEEE Transactions on Visualization and Computer Graphics, vol. 16, no. 4, pp. 599-608, July-August 2010, which is incorporated herein by reference in its entirety.

As shown in FIG. 4A, the nearest neighbor network graph 410 includes nodes that correspond to digital data points from the sampled subset of digital data points and edges between the nodes determined by the nearest neighbor model 408. For example, edges of the nearest neighbor network graph 410 can connect a particular node to its k-nearest neighbors as determined by the nearest neighbor model 408.

It should be noted that neither the nearest neighbor network graph 410 nor the various other network graphs discussed with reference to many of the following figures are illustrated to scale. Indeed, in many instances, the network graphs generated by the visualization generation system 106 include a large number of nodes and/or a complex structure of connections that is impractical to illustrate. Rather, the network graphs presented in the figures are merely for illustration purposes.

FIG. 4B illustrates a diagram of generating an augmented nearest neighbor network graph in accordance with one or more embodiments. As shown FIG. 4B, the visualization generation system 106 determines an unsampled subset (e.g., a remaining subset) of digital data points from the plurality of digital data points 404. In other words, the visualization generation system 106 identifies those digital data points from the digital dataset 402 not sampled for use in generating the nearest neighbor network graph 410-shown by the unsampled digital data points 412a-412g.

As further shown in FIG. 4B, the visualization generation system 106 applies a witness complex model 414 to the unsampled subset of digital data points. Indeed, the visualization generation system 106 applies the witness complex model 414 to modify the nearest neighbor network graph 410 based on the unsampled subset of digital data points. For example, in one or more embodiments, the unsampled subset of digital data points includes a plurality of witness points. For example, in some embodiments, each unsampled digital data point is a witness point. As used herein, the term "witness point" refers to a digital data point (e.g., an unsampled digital data point) used by a witness complex model to analyze, process, or modify a network graph (e.g., the nearest neighbor network graph 410). The visualization generation system 106 can utilize the witness complex model 414 to connect pairs of unconnected nodes within the nearest neighbor network graph 410 based on a plurality of witness points (i.e., based on the unsampled digital data points) in order to generate the augmented nearest neighbor network graph 416.

To illustrate, in one or more embodiments, the visualization generation system 106 selects an unsampled digital data point 418 from the unsampled subset of digital data points (e.g., selects one of the unsampled digital data points 412a-412g). The visualization generation system 106 identifies a pair of nearest neighbors (e.g., the nodes 420a and 420b) for the unsampled digital data point 418 within the nearest neighbor network graph 410. In particular, the visualization generation system 106 can identify a pair of nodes that correspond to digital data points that are nearest to the unsampled digital data point 418 within the feature space.

The visualization generation system 106 can further determine that the pair of nearest neighbors within the nearest neighbor network graph are unconnected. The visualization generation system 106 can add an edge 422 to connect the pair of nearest neighbors within the nearest neighbor network graph 410 based on determining that the pair of nearest neighbors are unconnected. In one or more embodiments, based on determining that the pair of nearest neighbors are already connected, the visualization generation system 106 can leave the connection intact. In some embodiments, the visualization generation system 106 iteratively selects each unsampled digital data point, identifies the corresponding nearest neighbors within the nearest neighbor network graph 410, and adds an edge to connect the nearest neighbors upon determining that they unconnected within the nearest neighbor network graph 410. Thus, the visualization generation system 106 can generate the augmented nearest neighbor network graph 416.

In one or more embodiments, the visualization generation system 106 applies a witness complex model as described by Vin de Silva and Gunnar Carlsson, 2004, *Topological Estimation Using Witness Complexes*, in Proceedings of the First Eurographics Conference on Point-Based Graphics, Eurographics Association, 157-66, https://doi.org/10.2312/

SPBG/SPBG04/157-166, which is incorporated herein by reference in its entirety. In some embodiments, the visualization generation system 106 applies a witness complex model as described in Leonidas J. Guibas and Steve Y. Oudot, 2008, *Reconstruction Using Witness Complexes*, Discrete & Computational Geometry 40, 3, 325-356, which is incorporated herein by reference in its entirety.

Additional detail regarding generating nearest neighbor network graphs and augmented nearest neighbor network graphs in accordance with one or more embodiments will now be provided. In one or more embodiments, the visualization generation system 106 processes a digital dataset $X=\{x_i \in \mathbb{R}^d, i=1, 2, \ldots, N\}$ where $X \in \mathbb{R}^{D \times N}$ with N records and digital data points in D dimensional space. In one or more embodiments, the digital dataset is large-scale and includes high-dimensional data. The visualization generation system 106 uniformly samples M digital data points, resulting in a subset of sampled digital data points $X_M$. The visualization generation system 106 generates an undirected, unweighted neighborhood network graph $G_M=(V_M, E_M)$, where each node $v_i \in V_M$, corresponding to the digital data point $x_i \in X_M$, is connected to its k-nearest neighbors. Further, each edge $e_{x_i, x_j} \in E_M$ if $x_j$ is in the nearest neighborhood set of $x_i$ or vice versa. The visualization generation system 106 further augments the graph using the remaining digital data points $X \setminus X_M$ to build a 1-witness complex. For example, for a digital data point $x_r \in X \setminus X_M$ let $x_p$, $x_q$ be its two nearest neighbors from $X_M$, the visualization generation system 106 determines that the digital data point $x_r$ is witnessing the 1-simplex $\{x_p, x_q\}$ and adds an edge $e_{x_p, x_q}$ if not already present in the edge set $E_M$.

Figure 5B:
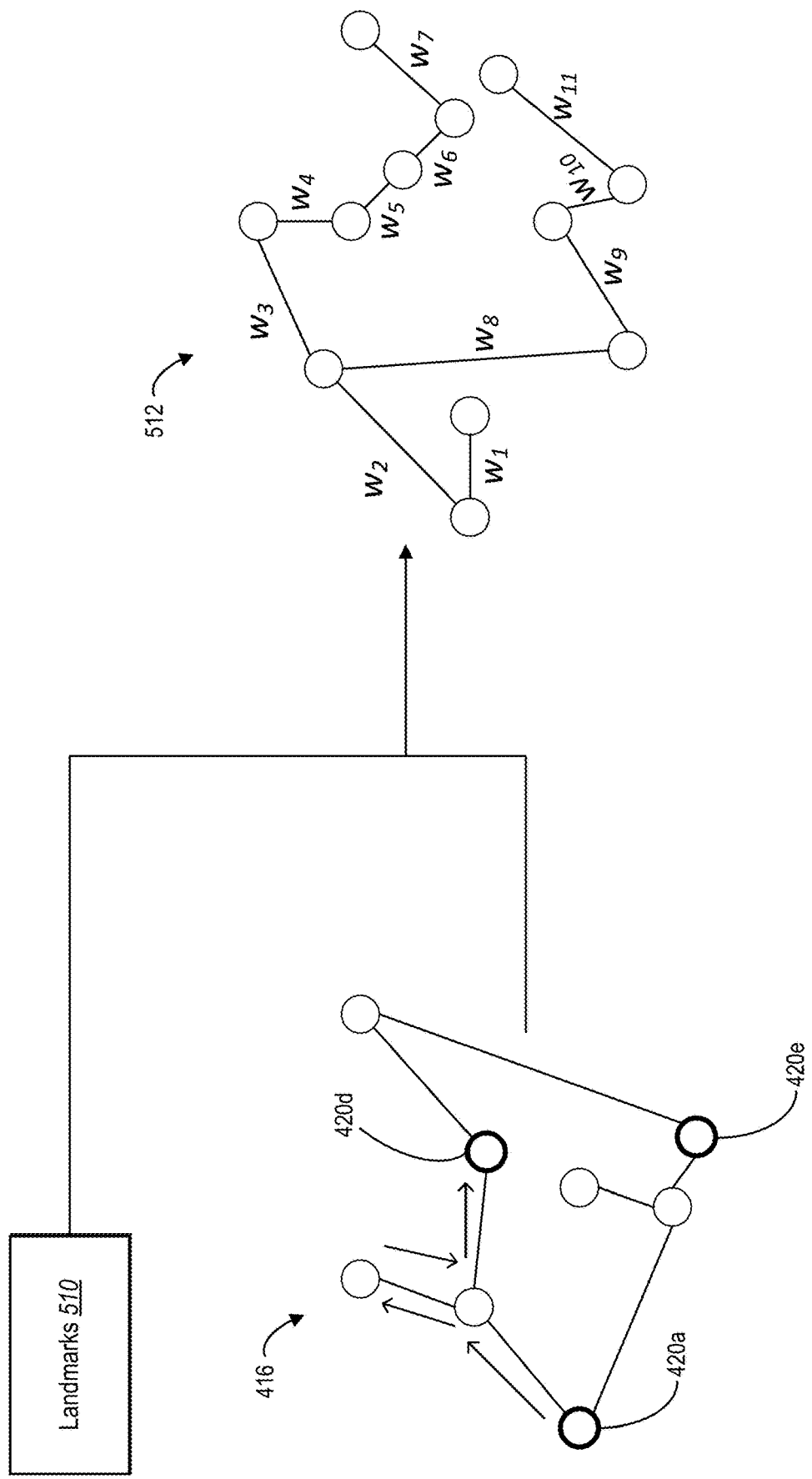
FIG. 5B illustrates a diagram for generating a landmark network graph in accordance with one or more embodiments.

As mentioned above, the visualization generation system 106 can further generate a landmark network graph. In one or more embodiments, the visualization generation system 106 generates the landmark network graph utilizing the augmented nearest neighbor network graph. Indeed, in some instances, the augmented nearest neighbor network graph is too dense (e.g., made up of too many digital data points) to provide an insightful visualization of the digital data. Accordingly, the visualization generation system 106 can select landmarks from among those sampled digital data points represented in the augmented nearest neighbor network graph and generate a corresponding landmark network graph to further reduce the number of represented digital data points. FIGS. 5A-5B illustrate diagrams for generating a landmark network graph in accordance with one or more embodiments.

In particular, FIG. 5A, illustrates a diagram of selecting landmarks for a landmark network graph in accordance with one or more embodiments. As shown in FIG. 5A, the visualization generation system performs an act 502 of selecting a landmark. In particular, the visualization generation system 106 selects a landmark from the sampled subset of digital data points (e.g., selects one of the sampled digital data points 406a-406e) from the plurality of digital data points 404. In one or more embodiments, the visualization generation system 106 selects the landmark by sampling a digital data point from the sampled subset of digital data points. For example, in some embodiments, the visualization generation system 106 randomly samples a digital data point from the sampled subset of digital data points to determine the landmark.

The visualization generation system 106 further identifies the node corresponding to the selected landmark within the augmented nearest neighbor network graph 416. In some embodiments, the visualization generation system 106 selects the landmark by sampling a node from the augmented nearest neighbor network graph 416 directly. The visualization generation system 106 can also identify all neighbor nodes within a threshold number of hops of the node corresponding to the selected landmark within the augmented nearest neighbor network graph 416. Moreover, the visualization generation system 116 can perform an act 504 of removing those identified neighbor nodes (i.e., removing the corresponding digital data points) from the sampled subset of digital data points. To illustrate and as shown in FIG. 5A, the visualization generation system 106 can identify the node 420a within the augmented nearest neighbor network graph 416 corresponding to a selected landmark. The visualization generation system 106 can remove the nodes 420b-420c (i.e., remove the digital data points corresponding to the nodes 420b-420c) from the sampled subset of digital data points because they fall within one hop of the node 420a.

The visualization generation system 106 can utilize various numbers of hops to determine which neighbor nodes to remove from the sampled subset of digital data points. In some embodiments, the visualization generation system 106 establishes the number of hops based on some user input (e.g., input received by an administrator).

As further shown in FIG. 5A, the visualization generation system 106 iteratively repeats (as shown by the line 506) the act 502 of selecting a landmark and the act 504 of removing identified neighbor nodes (i.e., removing the corresponding digital data points) from the sampled subset of digital data points. In one or more embodiments, the visualization generation system 106 iteratively repeats the acts 502, 504 until all digital data points from the sampled subset of digital data points have either been selected as a landmark or removed from the sampled subset of digital data points. Thus, the visualization generation system 106 can select landmarks that partition the augmented nearest neighbor network graph (e.g., reasonably represents the digital data associated with augmented nearest neighbor network graph).

Thus, the visualization generation system 106 can identify a plurality of landmarks from a sampled subset of digital data points from a digital database. Indeed, the visualization generation system 106 can utilize an augmented nearest neighbor network graph in identifying landmarks that are representative of neighboring digital data points within a feature space. As will be shown below with reference to FIG. 5B, the visualization generation system 106 can utilize the landmarks as nodes within a landmark network graph.

FIG. 5B illustrates a diagram of determining edges and corresponding edge strengths for a landmark network graph in accordance with one or more embodiments. Indeed, as shown in FIG. 5B, the visualization generation system 106 determines the edges and corresponding edge strengths for the landmark network graph 512 based on the landmarks 510 sampled from the sampled subset of digital data points. The visualization generation system 106 further determines the edges and corresponding edge strengths for the landmark network graph 512 utilizing the augmented nearest neighbor network graph 416.

In one or more embodiments, the visualization generation system 106 performs a plurality of random walks on the augmented nearest neighbor network graph 416 based on the landmarks 510 to determine the edges and corresponding edge strengths for the landmark network graph 512. Indeed, in some embodiments, the visualization generation system 106 utilizes the landmarks 510 as starting points for performing the plurality of random walks. The visualization generation system 106 can perform various quantities of random walks on the augmented nearest neighbor network graph 416 and can further perform random walks of various lengths. In one or more embodiments, the visualization generation system 106 establishes the number of random walks performed and/or the length of the random walks based on some user input (e.g., input received by an administrator).

To illustrate, in one or more embodiments, the visualization generation system 106 identifies the node 420a corresponding to a landmark from the landmarks 510. The visualization generation system 106 performs a random walk by traversing the augmented nearest neighbor network graph 416 beginning at the node 420a. For example, at each step of the random walk, the visualization generation system 106 can determine to remain at the current node or to progress to a neighboring node that is directly connected to the current node. In one or more embodiments, the visualization generation system 106 determines with equal likelihood whether to remain at the current node or to progress to a neighboring node. In some embodiments, the visualization generation system 106 determines whether to remain at the current node or to progress to a neighboring node based on some probability. For example, in one or more embodiments, the visualization generation system 106 utilizes a Finite Markov Chain to model the movement of a hypothetical particle through the augmented nearest neighbor network graph 416.

In one or more embodiments, if at least one random walk beginning at the node 420a terminates at another node corresponding to another landmark (e.g., one of the nodes 420d-420e), the visualization generation system 106 initializes an edge between the node 420a and the other node corresponding to the other landmark within the landmark network graph 512. In some embodiments, the visualization generation system 106 will initialize an edge between the node 420a and the other node if at least one random walk begins at the other node and terminates at the node 420a. In some instances, the visualization generation system 106 initializes an edge between the node 420a and the other node as long as at least one random walk beginning at the node 420a terminates within the neighborhood of the other node or vice versa. In some embodiments, the visualization generation system 106 requires multiple (e.g., some threshold number of) random walks beginning at the node 420a to terminate at the other node corresponding to the other landmark (or its neighborhood) or vice versa before initializing an edge between the node 420a and the other node within the landmark network graph 512.

Indeed, as just mentioned, the visualization generation system 106 can initialize edges between nodes corresponding to landmarks within the landmark network graph 512 based on random walks terminating within the neighborhood of one of the nodes. In one or more embodiments, the visualization generation system 106 determines the neighborhoods of nodes corresponding to landmarks based on the landmark-selection process discussed above with reference to FIG. 5A. For example, the visualization generation system 106 can determine the neighborhood of a particular landmark to include those neighbor nodes identified within a threshold number of hops of the landmark in the augmented nearest neighbor network graph 416.

In one or more embodiments, the visualization generation system 106 further determines an edge strength between a pair of nodes corresponding to landmarks based on the number of random walks performed on the augmented nearest neighbor network graph 416. In particular, the visualization generation system 106 can determine the edge strength based on the number of random walks that begin at one node corresponding to one landmark and terminate at another node corresponding to another landmark (or its neighborhood) or vice versa. For example, the visualization generation system 106 can associate, within the landmark network graph 512, a first edge strength with an edge between landmarks corresponding to the nodes 420a and 420d based on a first number of random walks that begin at the node 420a and terminate at the node 420d (or its neighborhood) or vice versa. The visualization generation system 106 can further associated a second edge strength with an edge between landmarks corresponding to the nodes 420a and 420e based on a second number of random walks that begin at the node 420a and terminate at the node 420e (or its neighborhood) or vice versa. In some embodiments, the visualization generation system 106 associates a higher edge strength with a node when a greater number of random walks begin at one node and terminate at another (or its neighborhood) or vice versa. For example, in one or more embodiments, the visualization generation system 106 determines the edge strength of an edge connecting a first node and a second node based on a ratio of the number of random walks that began at the first node and terminated at the second node (or its neighborhood) and the total number of random walks that began at the first node. In some embodiments, the visualization generation system 106 determines the edge strength for the edge connecting the first node and the second node further based on a ratio of the number of random walks that began at the second node and terminated at the first node (or its neighborhood) and the total number of random walks that began at the second node.

Thus, the visualization generation system 106 can generate the landmark network graph 512. As shown in FIG. 5B, the landmark network graph 512 includes nodes corresponding to the landmarks 510 sampled from the sampled subset of digital data points using the augmented nearest neighbor network graph 416. The landmark network graph 512 further includes edges and edge weights (labeled $w_1$-$w_{11}$) determined using a plurality of random walks performed on the augmented nearest neighbor network graph 416 based on the landmarks 510.

Additional detail regarding generating landmark network graphs in accordance with one or more embodiments will now be provided. In one or more embodiments, the visualization generation system 106 selects a set of landmarks L from the subset of sampled digital data points $X_M$ using an inductive procedure. For example, in some instances, the visualization generation system 106 starts by selecting the first landmark $L_1$ from $X_M$ uniformly at random. At the i-th iteration, the visualization generation system 106 can mark the k-neighbors of the previously selected landmark $L_{i-1}$ as covered and remove them from $X_M$. Indeed, the visualization generation system 106 can identify these k-neighbors as a neighborhood set of the landmark $L_{i-1}$. The visualization generation system 106 then inductively selects another random point from the remaining set to be to be $L_i$ until all points in $X_M$ are marked. Thus, the visualization generation system 106 ensures a selection of landmarks whose neighborhood sets partition the augmented nearest neighbor network graph.

In one or more embodiments, the visualization generation system 106 selects the landmarks as described in Hao Shi et al., *Robust l-Isomap with a Novel Landmark Selection Method*, in Mathematical Problems in Engineering, 2017, which is incorporated herein by reference in its entirety.

In some instances, upon sampling the set of landmarks L capturing the topology of the underlying manifold, the visualization generation system 106 generates a weighted, undirected graph $G_L$ on this set using the graph $G_M$ (the augmented nearest neighbor network graph). In some embodiments, $G_L=(V_L, E_L, W)$ where each node $v_i \in V_L$ corresponds to the landmark $L_i$. Further, the visualization generation system 106 determines the edges $E_L$ and their weights W using a Finite Markov Chain to model the random movement of a hypothetical particle on the data manifold. In particular, the visualization generation system 106 utilizes the landmarks as the states. For each landmark $L_i$, the visualization generation system 106 performs $\beta$ random walks of fixed length $\theta_1 \leq \theta \leq \theta_2$ on $G_M$. In one or more embodiments, the visualization generation system 106 utilizes the following when performing the random walks:

$$a_{ij} = \begin{cases} \dfrac{n_{ij}}{\sum_k n_{ik}}, & \text{if } n_{ij} \geq th \\ 0, & \text{otherwise} \end{cases} \quad (1)$$

In equation 1, $n_{ij}$ represents the number of random walks that started from landmark $L_i$ and have their endpoint in the neighborhood set of landmark $L_j$. Using equation 1, the visualization generation system 106 can generate the sparse matrix $A=[a_{ij}]$, which is asymmetric. The visualization generation system 106 can then determine the weight matrix $W=[w_{ij}]$ as a symmetric matrix $W=A+A^T - A \circ A^T$ where $\circ$ is the Hadamard (or pointwise) product.

Figure 6:
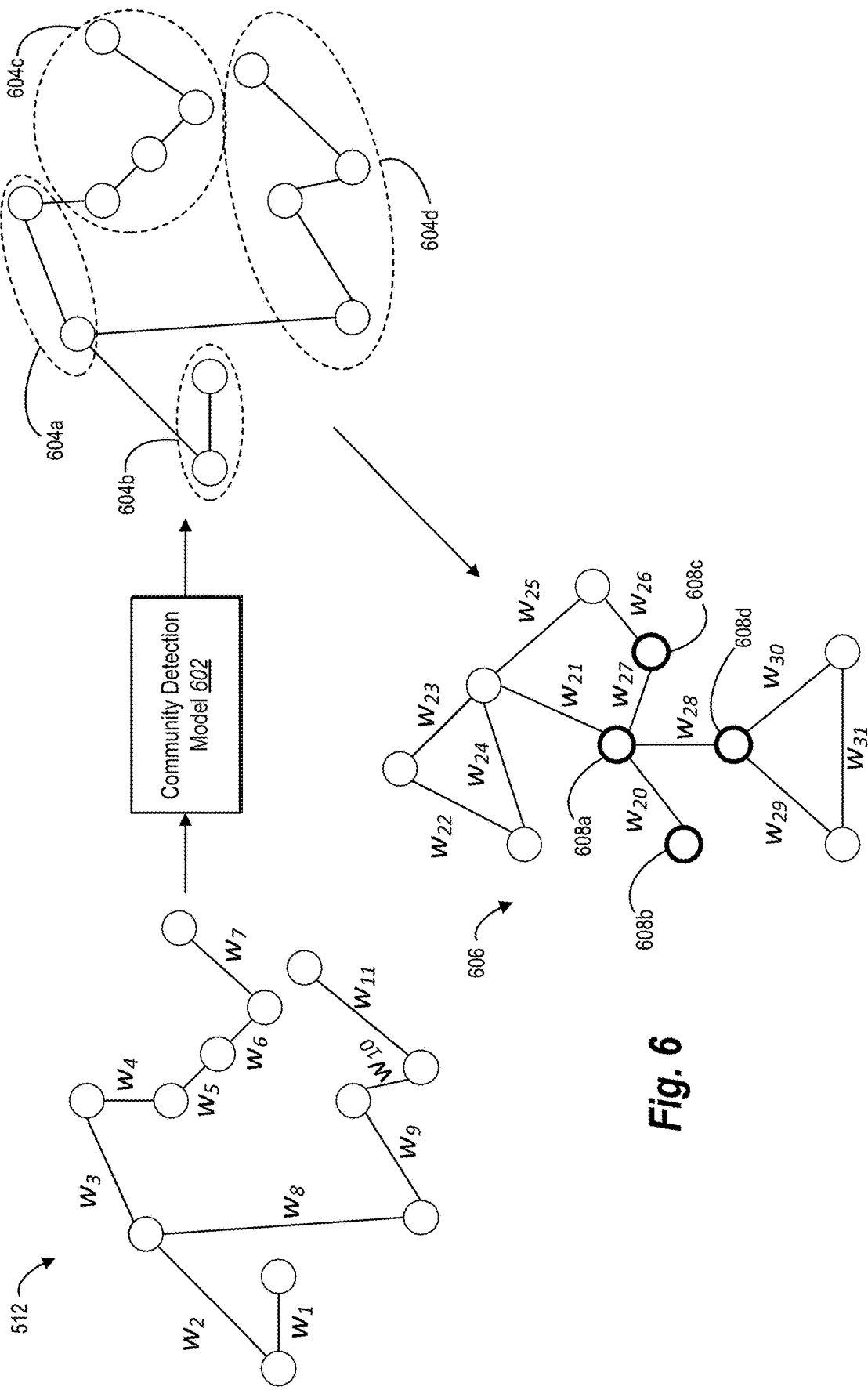
FIG. 6 illustrates a diagram for determining a partition of a landmark network graph in accordance with one or more embodiments.

As mentioned above, the visualization generation system 106 can determine a partition of a landmark network graph. Indeed, in some instances, the visualization system 106 utilizes a partition of the landmark network graph to capture the shape of the date represented by the landmark network graph while providing higher-level homological features for more insightful visualization. FIG. 6 illustrates a diagram of utilizing a partition of a network graph in accordance with one or more embodiments.

As shown in FIG. 6, the visualization generation system 106 can determine a partition of the landmark network graph 512 utilizing a community detection model 602. In one or more embodiments, the visualization generation system 106 utilizes the community detection model 602 to determine a partition of the landmark network graph 512 that includes communities of landmark groups and a plurality of community edges. For example, the visualization generation system 106 can utilize the community detection model 602 to determine a partition where each node from the landmark network graph belongs to a single community. For example, as shown in FIG. 6, the community detection model 602 determines the communities 604a-604d that include landmarks (i.e., nodes representing the landmarks) from the landmark network graph 512. In particular, in one or more embodiments, each of the communities 604a-604d includes landmarks that are not included in any of the other communities 604a-604d.

In one or more embodiments, the community detection model 602 utilizes a modularity-based community detection algorithm that utilizes network structure properties to determine the communities of landmark groups. For example, in some instances the community detection model 602 includes a Louvain-based community detection model that utilizes a greedy optimization method that determines the communities of landmark groups based on increasing the overall modularity of the resulting partition. In particular, in a first phase, the community detection model 602 can move individual nodes to a neighboring community that provides the largest increase in modularity. In a second phase, the community detection model 602 can generate an induced network graph where each node corresponds to a determined community. The community detection model 602 can repeat the two phases until modularity cannot be increased further. Indeed, in one or more embodiments, the community detection model 602 can generate partitions of landmark graphs as described in Pasquale De Meo et al., *Generalized Louvain Method for Community Detection in Large Networks*, In 2011 11$^{th}$ International Conference of Intelligent Systems Design and Applications, IEEE, 88-93, 2011, which is incorporated herein by reference in its entirety.

In some embodiments, the community detection model 602 includes a Leiden-based community detection model that determines the communities based on a general notion of increasing modularity. In particular, in a first phase, the community detection model 602 can move nodes to communities to optimize modularity. In a second phase, the community detection model 602 can merge a node with any community for which the modularity increases. In some embodiments, the community detection model 602 randomly selects the community with which to merge a given node. In a third phase, the community detection model 602 can generate an induced network graph where each node corresponds to a determined community. Indeed, in one or more embodiments, the community detection model 602 can generate partitions of landmark graphs as described in Vincent A Traag et al., *From Louvain to Leiden: Gauranteeing Well-connected Communities*, Scientific Reports 9 (2019).

In one or more embodiments, the visualization generation system 106 utilizes the community detection model 602 to determine community edges between the communities of landmark groups and based on the edges between the landmarks within the landmark network graph 512. For example, in one or more embodiments, the community detection model 602 determines that an edge exists between a first community and a second community if at least one edge exists between a landmark of the first community and a landmark of the second community. In some embodiments, the community detection model 602 requires that a plurality of edges exist between the landmarks of two communities in order to determine that an edge exists between those communities.

In some embodiments, the visualization generation system 106 further utilizes the community detection model 602 to determine edge strengths of the community edges based on the edge strengths corresponding to the edges between the landmarks within the landmark network graph 512. For example, in one or more embodiments, the community detection model 602 determines that an edge between two communities of landmark groups has a corresponding edge strength based on the edge strengths of the edges between the landmarks of those communities. In particular, in some instances, the community detection model 602 determines that the edge strength of the edge between the two communities equals the sum of the edge strengths of the edges between the corresponding landmarks.

Thus, the visualization generation system 106 can generate the partitioned landmark network graph 606. As shown in FIG. 6, the partitioned landmark network graph 606 includes nodes representing the communities of landmark groups (where the nodes 608a-608d correspond to the communities 604a-604d) and a plurality of community edges between the nodes representing the communities. Further, as shown in FIG. 6, the community edges of the partitioned landmark network graph 606 are associated with edge strengths (labeled $w_{20}$-$w_{31}$).

In one or more embodiments, the visualization generation system 106 utilizes the community detection model 602 to generate a plurality of partitions of the landmark network graph 512. For example, in some instances, the community detection model 602 generates a dendrogram structure that includes several levels of partitions of the landmark network graph 512. For example, the first level can include a partition having the smallest communities and the last level can include a partition having the largest communities. Accordingly, the visualization generation system 106 can determine the partition of the landmark network graph 512 by selecting from among the various partitions generated by the community detection model 602 (e.g., selecting the partitioned landmark network graph 606).

Additional detail regarding determining partitions of landmark network graphs in accordance with one or more embodiments will now be provided. In one or more embodiments, the visualization generation system 106 utilizes a nerve complex to determine a partition of a landmark network graph, where an open cover of a space X is a collection of open sets such that each point in the space is in at least one of these open sets (or "bins"). Given a cover $\mathcal{U}$ of a space X, the visualization generation system 106 can determine the nerve $N(\mathcal{U})$ to be a simplicial complex having the following qualities: (1) the vertices (nodes) of $N(\mathcal{U})$ correspond to bins of U; and (2) if k+1 bins of $\mathcal{U}$ have a mutual non-empty intersection in X, $N(\mathcal{U})$ contains a k-simplex with the corresponding nodes as its vertices. In particular, the visualization generation system 106 can determine a covering of X (the digital dataset) that captures its shape through the graph $G_L$ (the landmark network graph).

The visualization generation system 106 can determine the covering of X by partitioning the landmark network graph into well-separated communities using the community detection model 602. In one or more embodiments, the visualization generation system 106 generates an induced graph IG (i.e., the partitioned landmark network graph 606) based on the partition determined by the community detection model 602. As mentioned above, in some embodiments, the community detection model 602 determines various partition levels. In particular, the visualization generation system 106 determine sets $\{C_i\}$ that cover the set $V_L$ associated with the graph $G_L$. Accordingly, the $IG_p$ refers to the induced graph generated based on partition level p.

Figure 7A:
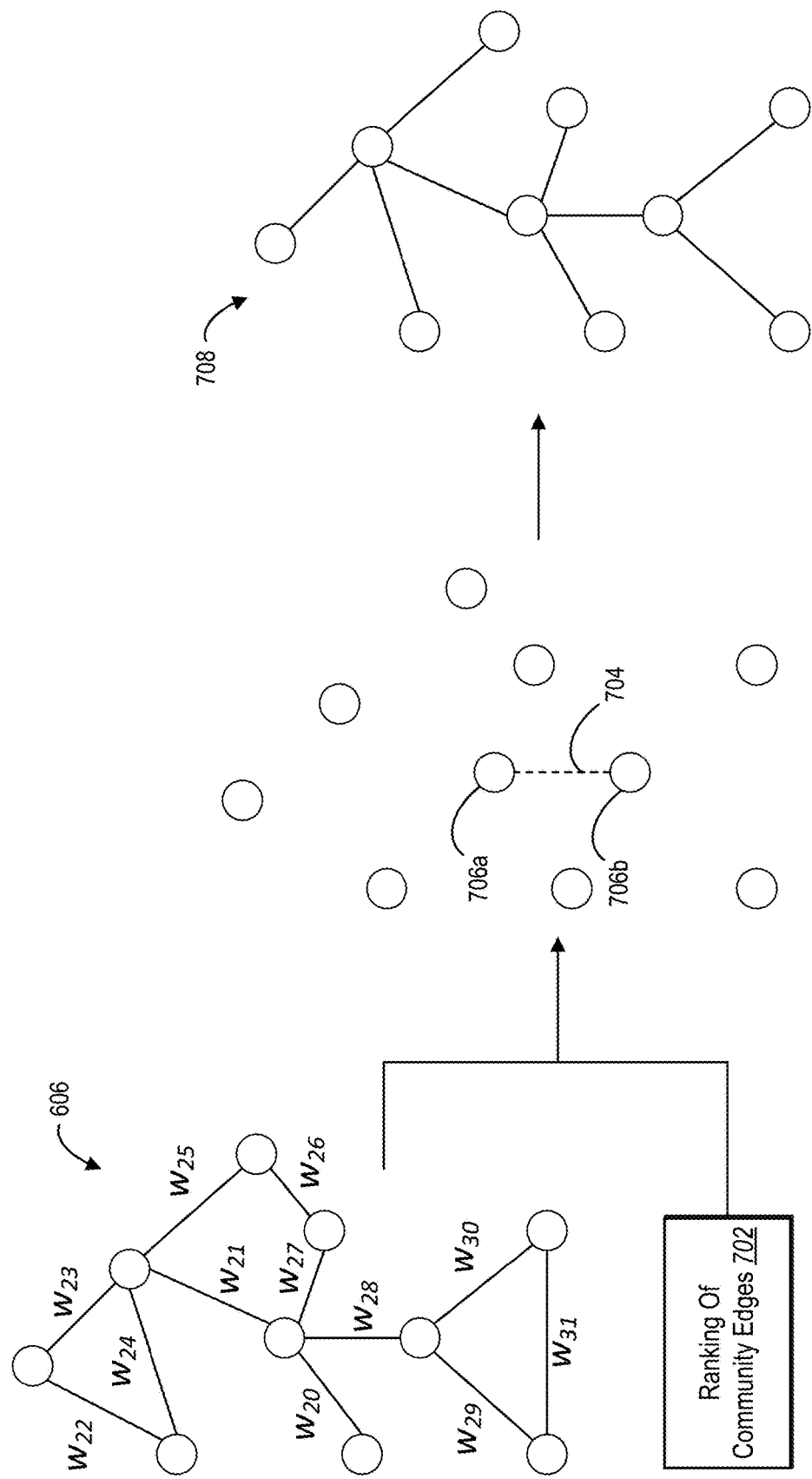
FIG. 7A illustrates a diagram for generating a spanning network graph in accordance with one or more embodiments.
Figure 7B:
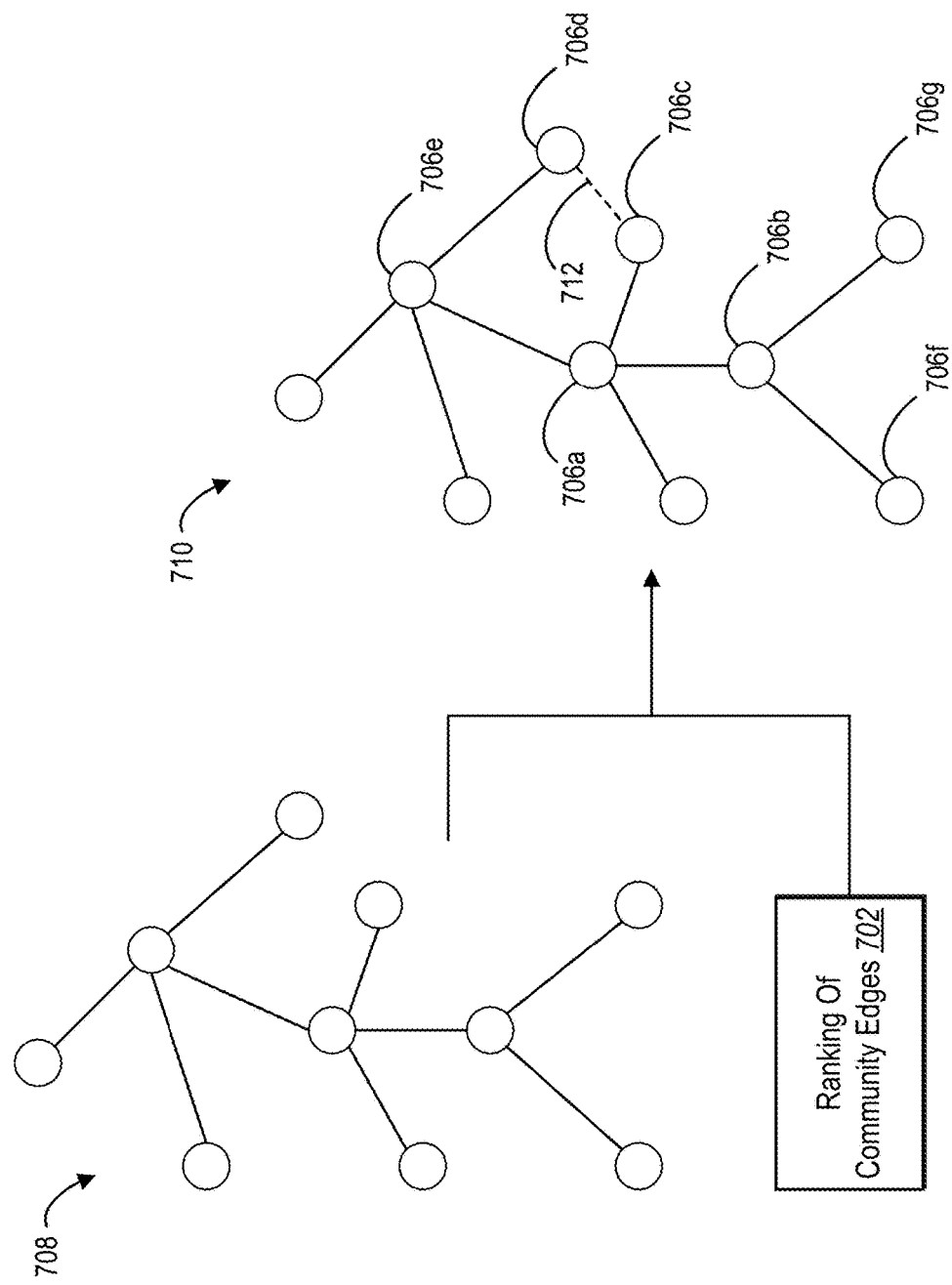
FIG. 7B illustrates a diagram for generating a loop-augmented spanning network graph in accordance with one or more embodiments.

As previously mentioned, in one or more embodiments, the visualization generation system 106 generates a loop-augmented spanning network graph based on the partitioned landmark network graph. Indeed, in some instances, the partitioned landmark network graph is dense with community edges, which can result in an incomprehensible representation of the underlying digital data. Accordingly, the visualization generation system 106 can generate a loop-augmented spanning network graph to reduce the density of community edges for a more comprehensible visualization. FIGS. 7A-7B illustrate diagrams of generating a loop-augmented spanning network graph in accordance with one or more embodiments. As will be explained, in one or more embodiments, the loop-augmented spanning network graph includes the nodes representing the communities of landmark groups from the partitioned landmark network graph and at least a subset of the community edges of the landmark network graph. In other words, the visualization generation system 106 can generate the loop-augmented spanning network graph by introducing the community edges to connect nodes representing the communities.

In particular, FIG. 7A illustrates a diagram for generating a spanning network graph in accordance with one or more embodiments. Indeed, as shown in FIG. 7A, the visualization generation system 106 generates a spanning network graph 708 that includes the nodes that represent communities of landmark groups from the partitioned landmark network graph 606. Further, the spanning network graph 708 includes a first subset of the community edges from the landmark network graph 606.

In one or more embodiments, the visualization generation system 106 adds the first subset of community edges from the landmark network graph 606 to the spanning network graph 708 using a ranking of the community edges based on modularities of the community edges. Indeed, in one or more embodiments, the visualization generation system 106 determines a ranking of community edges 702 from the landmark network graph 606 based on corresponding modularities. In some instances, the visualization generation system 106 determines the modularity of a community edge based on the modularities of the communities connected by the community edge. For example, the visualization generation system 106 can determine the modularity of a community edge as the sum of the modularities of the connected communities. In some instances, the visualization generation system 106 determines the modularity of a community edge based on the modularity of one of the connected communities (e.g., the community having the highest modularity or the lowest modularity). In other instances, the visualization generation system 106 can determine the modularity of a community edge to equal the edge strength of the community edge (e.g., as determined when determining the partition of the landmark network graph).

As mentioned, the visualization generation system 106 can add community edges to the spanning network graph 708 based on the ranking of community edges 702. For example, the visualization generation system 106 can add the community edge 704 to connect the nodes 706a-706b based on the community edge 704 having the highest modularity compared to the other community edges (e.g., where the community edge 704 is the first community edge added to the spanning network graph 708). Indeed, the visualization generation system 106 can add community edges to connect nodes within the spanning network graph 708 beginning with the highest-ranked community edge and progressing toward lower-ranked community edges.

In some embodiments, the visualization generation system 106 adds the first subset of community edges from the landmark network graph 606 to the spanning network graph 708 further based on a measure of connectivity of the first subset of community edges relative to the communities. For example, in one or more embodiments, the visualization generation system 106 determines to add a community edge to connect a pair of nodes within the spanning network graph 708 if at least one of those nodes is unconnected to another node within the spanning network graph 708. Conversely, the visualization generation system 106 can determine to not add a community edge to connect a pair of nodes within the spanning network graph 708 if both of those nodes are already connected to at least one other node within the spanning network graph 708. Indeed, in one or more embodiments, even if a community edge ranks high within the ranking of community edges 702, the visualization generation system 106 may determine to not add that community edge within the spanning network graph 708 if the nodes that would be connected by the community edge are already connected within the spanning network graph 708.

FIG. 7B illustrates a diagram for generating a loop-augmented spanning network graph in accordance with one or more embodiments. In particular, the visualization generation system 106 can generate the loop-augmented spanning network graph 710 by adding a second subset of community edges from the partitioned landmark network graph 606 to the spanning network graph 708. In one or more embodiments, the second subset of community edges includes a subset of those community edges from the partitioned landmark network graph 606 that were not added to the spanning network graph 708 as part of the first subset of community edges.

In one or more embodiments, the visualization generation system 106 adds the second subset of community edges to complete community loops within the spanning network graph 708. As an example, the visualization generation system 106 can add the community edge 712 to complete the community loop associated with the nodes 706a, 706c-706e. In some embodiments, the visualization generation system 106 adds community edges within the spanning network graph 708 to complete community loops having a predetermined number of community edges. For example, where the visualization generation system 106 establishes the predetermined number of community edges to be four, the visualization generation system 106 can add the community edge 712 to complete the community loop associated with the nodes 706a, 706c-706e. In contrast, the visualization generation system 106 can determine to not add a community edge to complete a community loop associated with the nodes 706b, 706f-706g—even if such a community loop was included in the partitioned landmark network graph 606—based on the community loop having less than the predetermined number of community edges. In some embodiments, the visualization generation system 106 establishes the predetermined number of community edges based on some user input (e.g., input received by an administrator).

In one or more embodiments, the visualization generation system 106 adds the second subset of community edges based on the ranking of the community edges 702. For example, in some embodiments, the visualization generation system 106 adds a community edge based on the sum of the modularities of the community edges in the resulting community loop being greater than or equal to a predetermined loop-modularity threshold. In one or more embodiments, the visualization generation system 106 establishes the predetermined loop-modularity threshold based on some user input (e.g., input received by an administrator).

In some embodiments, the visualization generation system 106 adds the second subset of community edges based on both a resulting community loop having a predetermined number of community edges and a predetermined loop-modularity threshold. Thus, the visualization generation system 106 can generate the loop-augmented spanning network graph 710.

Additional detail regarding generating spanning network graphs and loop-augmented spanning network graphs in accordance with one or more embodiments will now be provided. In particular, in one or more embodiments, the visualization generation system 106 determines a graph G=(V, E) having the same vertices (i.e., nodes) as the graph $IG_p$ (i.e., the partitioned landmark network graph) but with a smaller edge set E, such that G represents the overall topological structure of $G_L$ (i.e., the landmark network graph). The visualization generation system 106 can utilize a two-phase tearing procedure to generate G from $IG_p$.

For example, in the first phase, the visualization generation system 106 can determine the modularity for each community edge of the graph $IG_p$ and insert the community edge into an ordered heap of edges. The visualization generation system 106 can iteratively pop community edges from the heap and introduce the community edges into the graph $G_S$ (i.e., the spanning network graph) if it results in increased connectivity of the graph, until the graph $G_S$ has as many connected components as the graph $IG_p$. Accordingly, the graph $G_S=(V, E_1)$ represents a spanning sub-graph of the induced graph $IG_p$.

In the second phase, the visualization generation system 106 can introduce as few community loops into $G_S$ as possible to capture the structure of the data manifold as much as possible. In particular, the visualization generation system 106 can initialize G with the spanning sub-graph $G_S$ and gather the community edges discarded during the first phase in a set $S=E\backslash E_1$. In one or more embodiments, the visualization generation system 106 reintroduces those community edges from the set S that generate essential community loops. For example, in some embodiments, an essential community loop includes those community loops whose sum of edge modularities is more than or equal to c. In some embodiments, c is a user-defined hyperparameter.

Thus, the visualization generation system 106 constructs the graph G=(V, E) (i.e., the loop-augmented spanning network graph). As will be discussed in more detail below, the visualization generation system 106 can construct an interactive visual shape representation of the graph G for display on a client device.

The algorithm presented below is another description of how the visualization generation system 106 can generate a loop-augmented spanning network graph from a digital dataset. Indeed, the algorithm includes generating an augmented nearest neighbor network graph, landmark network graph, and partitioned landmark network graph.

Algorithm 1
Input: $\{X\} \in \mathcal{D}_n$
Output: Graph G
Sample $X_M \in X$
Initialize $G_M=(V_M, E_M)$; kNN on $X_M$
for $x \in \{X \backslash X_M\}$ do
   $x_p, x_q = NN(X_M, 2)$
   if $e_{x_p x_q} \notin E_M$ then
   $E_M = E_M \cup e_{x_p x_q}$
end
$X_L = \{ \}$
while len($X_M$)>0 do
   $x \in X_M$ Random Sample
   $X_L = X_L \cup \{x\}$
   $X_M = X_M \backslash \{x \cup Neigh(x)\}$
   Assign RevNeigh=x for each Neigh(x)
end
EndPoint={ }
for β times do
   random walk of length $\theta_1 \leq \theta \leq \theta_2$
   Starting Point $l \in X_L$
   Ending Point $l' \in X_M$
   EndPoint[l][RevNeigh(l')]+=1
end
Assign weight $w_{x_p, x_j} \propto$ EndPoint[$x_i$][$x_j$]
Induced Graph $IG_p$=CommunityDetection($G_L$)
G=ManifoldTearing ($IG_p$)
return G={V, E, W}

Figure 8:
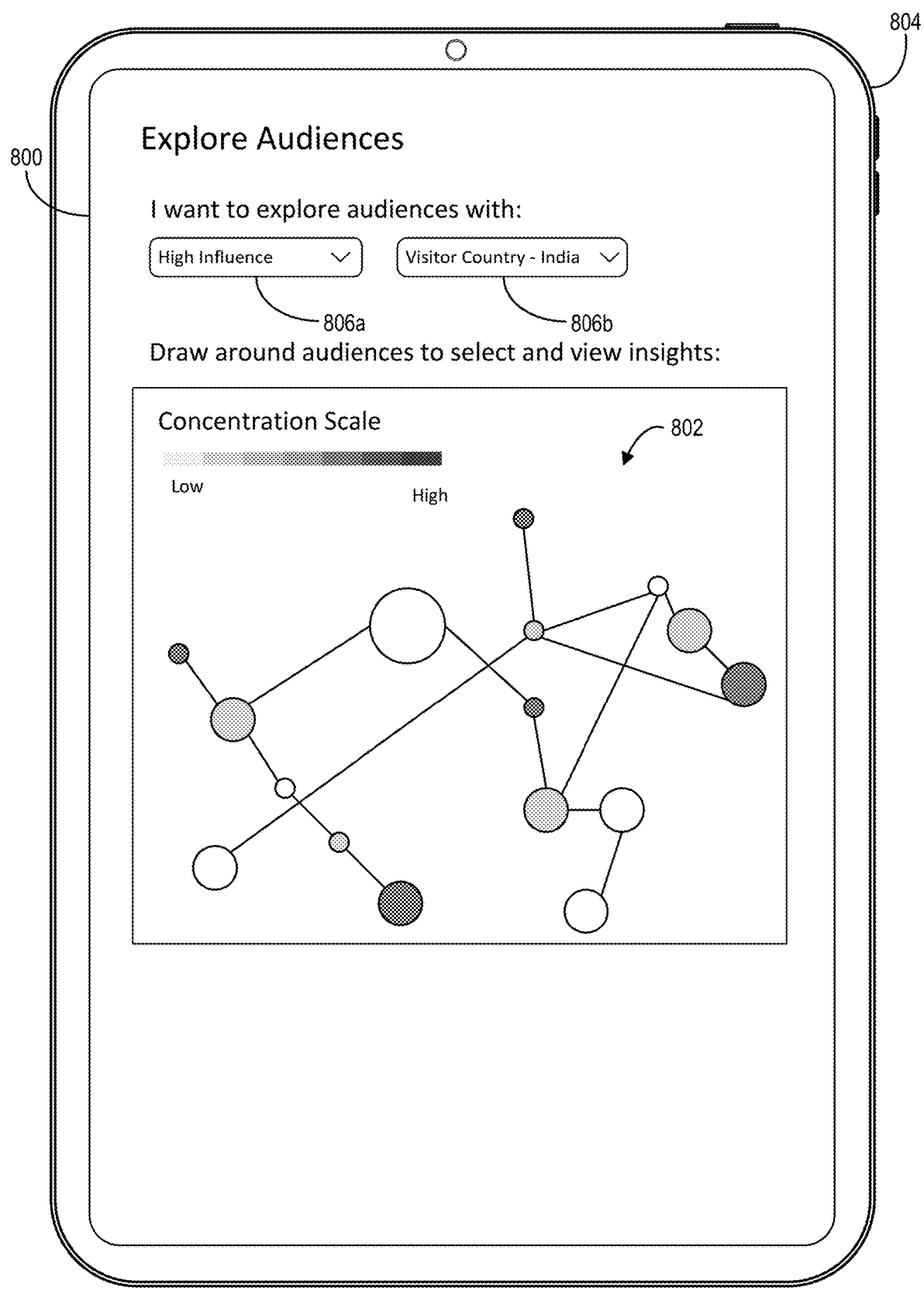
FIG. 8 illustrates a graphical user interface for displaying an interactive visual shape representation in accordance with one or more embodiments.

As previously mentioned, in one or more embodiments, the visualization generation system 106 generates an interactive visual shape representation of a digital dataset from a loop-augmented spanning network graph. The visualization generation system 106 can further provide the interactive visual shape representation for display on a client device. FIGS. 8-10 illustrate a user interface through which the visualization generation system 106 can provide an interactive visual shape representation in accordance with one or more embodiments.

In particular, FIG. 8 illustrates a graphical user interface 800 displaying an interactive visual shape representation 802 on a client device 804. In one or more embodiments, the interactive visual shape representation 802 includes the communities (i.e., the nodes representing the communities) and community edges of the underlying loop-augmented spanning network graph.

In some embodiments, the interactive visual shape representation 802 further includes one or more visual indicators that provide more detail regarding the represented digital data. For example, as shown in FIG. 8, the nodes of the interactive visual shape representation 802 vary in size. In particular, the visualization generation system 106 can associate a given node of the interactive visual shape representation 802 with a size that corresponds to a number of digital data points represented by the node. For example, the visualization generation system 106 can increase the size of a node as the number of digital data points represented by the node increases. But the visualization generation system 106 can use various other visual indicators to indicate a number of digital data points represented by a given node.

As another example, and as shown in FIG. 8, the nodes of the interactive visual shape representation 802 can vary in color (or shading, hue, brightness, etc.). In particular, the visualization generation system 106 can associate a given node of the interactive visual shape representation 802 with a color that corresponds to a concentration of a data characteristic (e.g., a user trait) within the community (i.e., associated with the digital data points of the community) represented by that node. But the visualization generation system 106 can use color (or shading, hue, brightness, etc.) to represents various other qualities of a data characteristic as well. For example, the visualization generation system 106 can utilize color to indicate a raw number, rather than a concentration, of user profiles associated with a particular data characteristic.

In one or more embodiments, the visualization generation system 106 can modify the visual indicators of the interactive visual shape representation 802 based on user input. For example, as shown in FIG. 8, the visualization generation system 106 can provide, through the graphical user interface 800, options 806a-806b for selecting variables of interest (e.g., selecting to view concentrations or "high influence" of visitors to a website or online store who are located in "India"). Upon receiving user selections via the options 806a-806b, the visualization generation system 106 can modify the visual indicators (e.g., the color, shade, hue etc.) associated with the nodes to reflect the user selections.

To illustrate, through the graphical user interface 800, the visualization generation system 106 can receive a change in a user trait selection. In particular, the visualization generation system 106 can detect that a user has interacted with the option 806b to change from a first user trait to a second user trait (e.g., from "India" to the "United States"). In response, the visualization generation system 106 can modify the colors of the nodes presented in the interactive visual shape representation 802 to reflect the concentrations of the second user trait within the corresponding communities. Similarly, in response to detecting a user selection via the option 806a to view raw numbers, rather than concentrations, the visualization generation system 106 can modify the colors of the nodes to reflect the raw numbers of user profiles having the selected user trait.

Figure 9A:
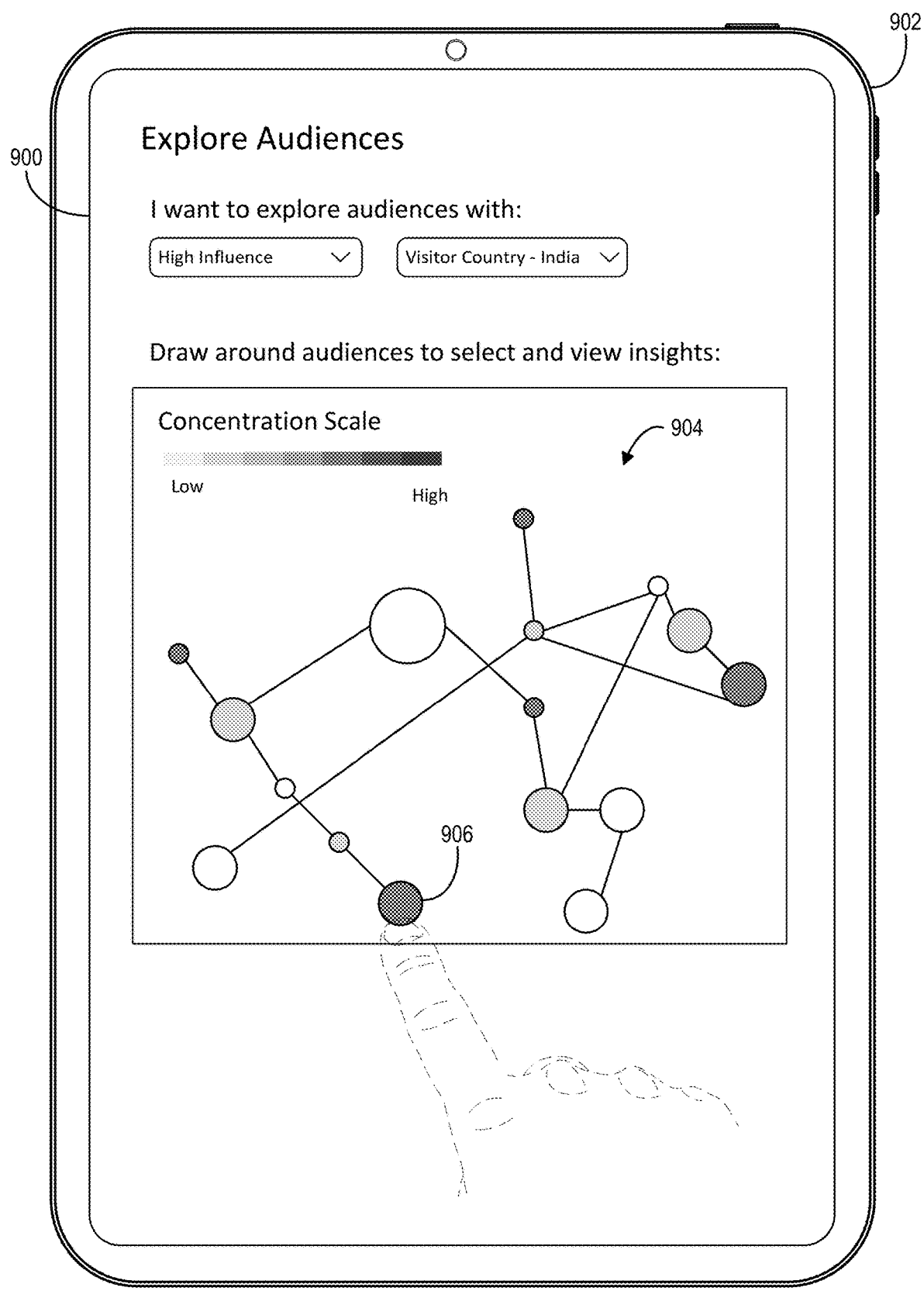
FIGS. 9A-9B illustrate a graphical user interface for providing visual representations of sub-communities corresponding to a selected community in accordance with one or more embodiments.
Figure 9B:
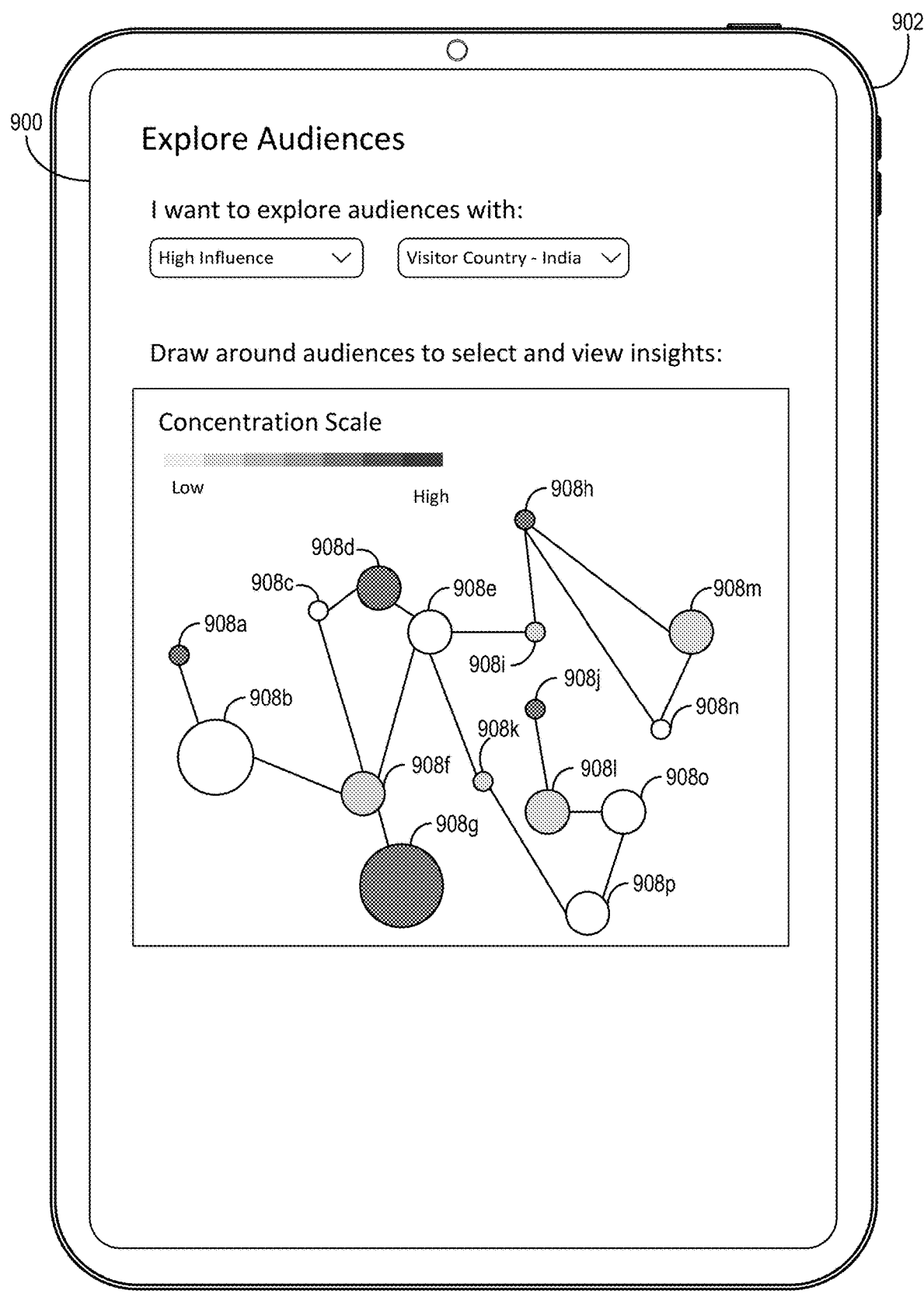
Figure 10:
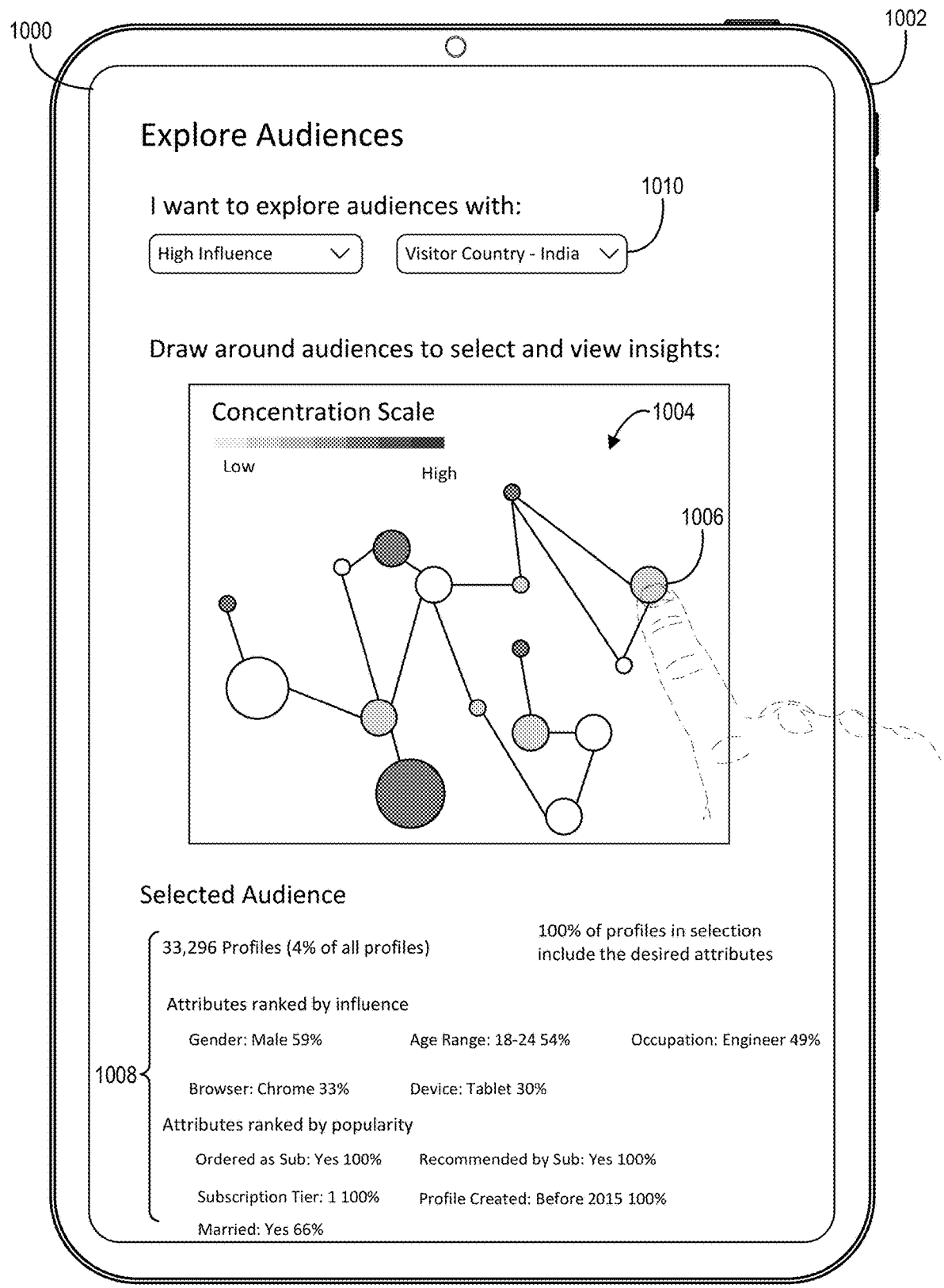
FIG. 10 illustrates a graphical user interface for providing a statistical visual summary for a selected community in accordance with one or more embodiments.

FIGS. 9A-9B illustrate a graphical user interface 900 through which the visualization generation system 106 can provide various levels of information for display on a client device 902 in response to a user interaction. In particular, as shown in FIG. 9A, the visualization generation system 106 provides the interactive visual shape representation 904 for display via the graphical user interface 900. As further shown in FIG. 9A, the visualization generation system 106 can receive a user interaction with the node 906 of the interactive visual shape representation 904 via the graphical user interface 900. Though FIG. 9A illustrates the user interaction as a touch interaction, the user interaction can include various other interactions, such as a click of the node 906 or using a cursor to hover over the node 906. Further, though FIG. 9A illustrates the user interaction selecting a single node, the user interaction can simultaneously select a plurality of nodes of the interactive visual shape representation 904.

As shown in FIG. 9B, in response to the user interaction with the node 906 of the interactive visual shape representation 904, the visualization generation system 106 provides, for display on the client device 902 via the graphical user interface 900, visual representations 908a-908p of sub-communities corresponding to the community associated with the node 906. Indeed, in one or more embodiments, in response to the user interaction with the node 906, the visualization generation system 106 determines a partition of the community associated with the node 906 that includes sub-communities corresponding to the community.

For example, in some instances, the visualization generation system 106 applies a community detection model to the landmarks of the community represented by the node 906 as discussed above with reference to FIG. 6 to determine a partition of the landmarks of the community that includes sub-communities of landmarks. The partition can further include sub-community edges that connect the sub-communities of landmarks based on the edges between the landmarks in the landmark network graph. The visualization generation system 106 can associate edge strengths with the sub-community edges based on the edge strengths of the edges between the landmarks. The visualization generation system 106 can further generate a loop-augmented spanning network graph based on the partition of the landmarks of the community as discussed above with reference to FIGS. 7A-7B. Accordingly, the visualization generation system 106 can generate and provide visual representations of the sub-communities for display within the graphical user interface 900 based on the corresponding loop-augmented spanning network graph.

In some embodiments, the visualization generation system 106 utilizes a partition previously determined via the community detection model 602 as discussed above with reference to FIG. 6. In particular, if sub-communities corresponding to the community were already determined when determining a plurality of partitions of the landmark network graph 512 using the community detection model, the visualization generation system 106 can generate a loop-augmented spanning network graph as discussed above with reference to FIGS. 7A-7B accordingly. The visualization generation system 106 can further provide visual representations of those sub-communities for display via the graphical user interface 900.

As shown in FIG. 9B, the visual representations 908a-908p of the sub-communities can include nodes corresponding to the sub-communities. The visualization generation system 106 can further provide a plurality of edges between the visual representations 908a-908p (e.g., sub-community edges connecting the nodes). In one or more embodiments, in response to a user selection of a node corresponding to a sub-community, the visualization generation system 106 can further determine a partition of the sub-community that includes further sub-communities and provide visual representations of those further sub-communities.

FIG. 10 illustrates a graphical user interface 1000 through which the visualization generation system 106 can provide a statistical visual summary for display on a client device 1002 in response to a user interaction. In particular, as shown in FIG. 10, the visualization generation system 106 provides the interactive visual shape representation 1004 for display via the graphical user interface 1000. In response to a user interaction with the node 1006, the visualization generation system 106 can provide a statistical visual summary 1008 of digital data corresponding to the community represented by the node 1006 (e.g., the digital data points included in the community).

As shown in FIG. 10, the statistical visual summary 1008 can include statistics corresponding to user traits associated with a plurality of user profiles associated with the community represented by the node 1006 (e.g., user profiles corresponding to the landmarks included in the community). For example, the statistical visual summary 1008 can include statistics corresponding to a user trait selected via the option 1010 provided via the graphical user interface 1000. As shown in FIG. 10, the statistical visual summary 1008 can include such information as the number of user profiles represented within the selected community, the percentage of user profiles within the selected community that are associated with the selected user trait, other user traits having a larger concentration within the selected community compared to their concentration within the digital data as a whole (labeled as "Attributes ranked by influence"), and the absolute value concentrations of other user traits within the selected community (labeled as "Attributes ranked by popularity"). In some embodiments, the statistical visual summary 1008 can include various additional or alternative statistics corresponding to the user traits.

Though FIG. 10 illustrates the statistical visual summary 1008 including statistics corresponding to user traits associated with a plurality of user profiles, the statistical visual summary 1008 can include statistics corresponding to various other data characteristics that correspond to user profiles or other digital data points represented by the interactive visual shape representation 1004.

As mentioned above, the visualization generation system 106 can provide a more accurate representation of the global and local structures associated with a digital dataset. Researchers have conducted studies to determine the accuracy of one or more embodiments of the visualization generation system 106 in capturing the global and local structures of digital datasets.

Figure 11:
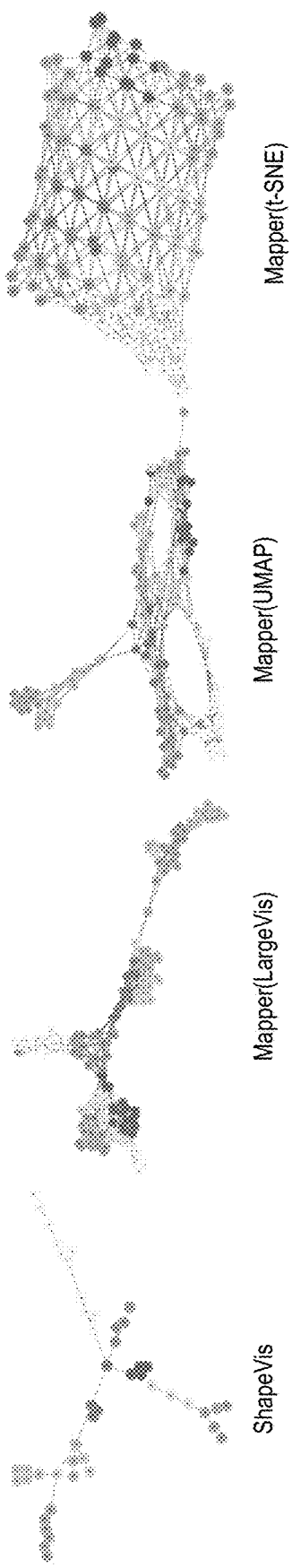
FIG. 11 illustrates a graphical representation reflecting experimental results regarding the effectiveness of the visualization generation system in accordance with one or more embodiments.

FIG. 11 illustrates a graphical representation reflecting experimental results regarding the effectiveness of the visualization generation system 106 in accordance with one or more embodiments. As shown in FIG. 11, graphical representation compares the performance of one embodiment of the visualization generation system 106 (labeled "Shape-Vis") with several version of the mapper algorithm. In particular, the graphical representation illustrates the performance of a first version of the mapper algorithm that utilizes a LargeVis dimensionality reduction model as a filter function, a second version of the mapper algorithm that utilizes UMAP dimensionality reduction model as the filter function, and a third version of the mapper algorithm that utilizes t-SNE dimensionality reduction models as the filter function.

Further, the graphical representation of FIG. 11 compares performance on the Modified National Institute of Standards and Technology (MNIST) database. In particular, the MNIST database includes 70,000 28×28 images of handwritten digits (0-9). Each digital data point in the MNIST database includes a 784-dimensional vector.

As shown in FIG. 11, the visualization generation system 106 performs similar to the LargeVis and UMAP versions of the mapper algorithm but more accurately than the t-SNE algorithm. In particular, each approach determines similar clusters of digits. As further shown in FIG. 11, the t-SNE version of the mapper algorithm doesn't perform well in capturing the global relationship among different digits.

Figure 12:
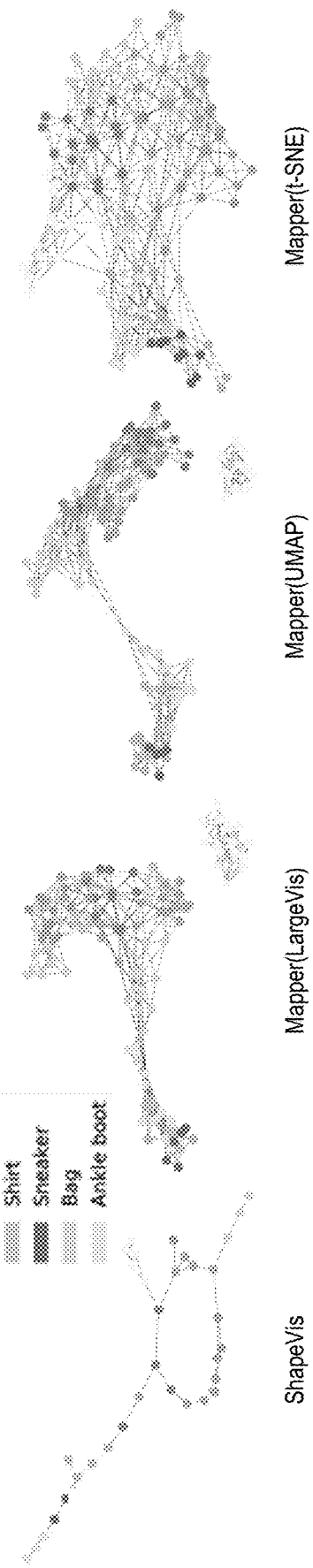
FIG. 12 illustrates another graphical representation reflecting further experimental results regarding the effectiveness of the visualization generation system in accordance with one or more embodiments.

FIG. 12 illustrates another graphical representation reflecting further experimental results regarding the effectiveness of the visualization generation system 106 in accordance with one or more embodiments. As shown in FIG. 12, the graphical representation compares the performance of one embodiment of the visualization generation system 106 with the LargeVis, UMAP, and t-SNE versions of the mapper algorithm.

Further, the graphical representation of FIG. 12 compares performance on the Fashion MNIST (FMNIST) database. In particular, the FMNIST dataset includes 70,000 28×28 images of fashion items, such as clothing, shoes, etc. The FMNIST dataset categorizes the images using ten different classes.

As shown in FIG. 12, all approaches are able to differentiate between clothing and footwear items. However, as can be seen, the visualization generation system 106 captures some of the global relationship between different classes more coherently. Indeed, the visualization provided by the visualization generation system 106 includes the "Trouser" class connected to the "Dress" class through a single node. By comparison, the visualizations provided by the LargeVis and UMAP versions of the mapper algorithm show the "Trouser" class completely disconnected from the rest of the graph. Further, the visualization provided by the visualization generation system 106 includes the "Bag" class connected to the "T-shirt/top" class while the visualizations provided by the LargeVis and UMAP versions of the mapper algorithm show the "Bag" class connected to the "Ankleboot" class. As further shown in FIG. 12, though the visualization provided by the t-SNE version of the mapper algorithm captures these relationships to some extent, it is more ambiguous and not well segmented.

Figure 13:
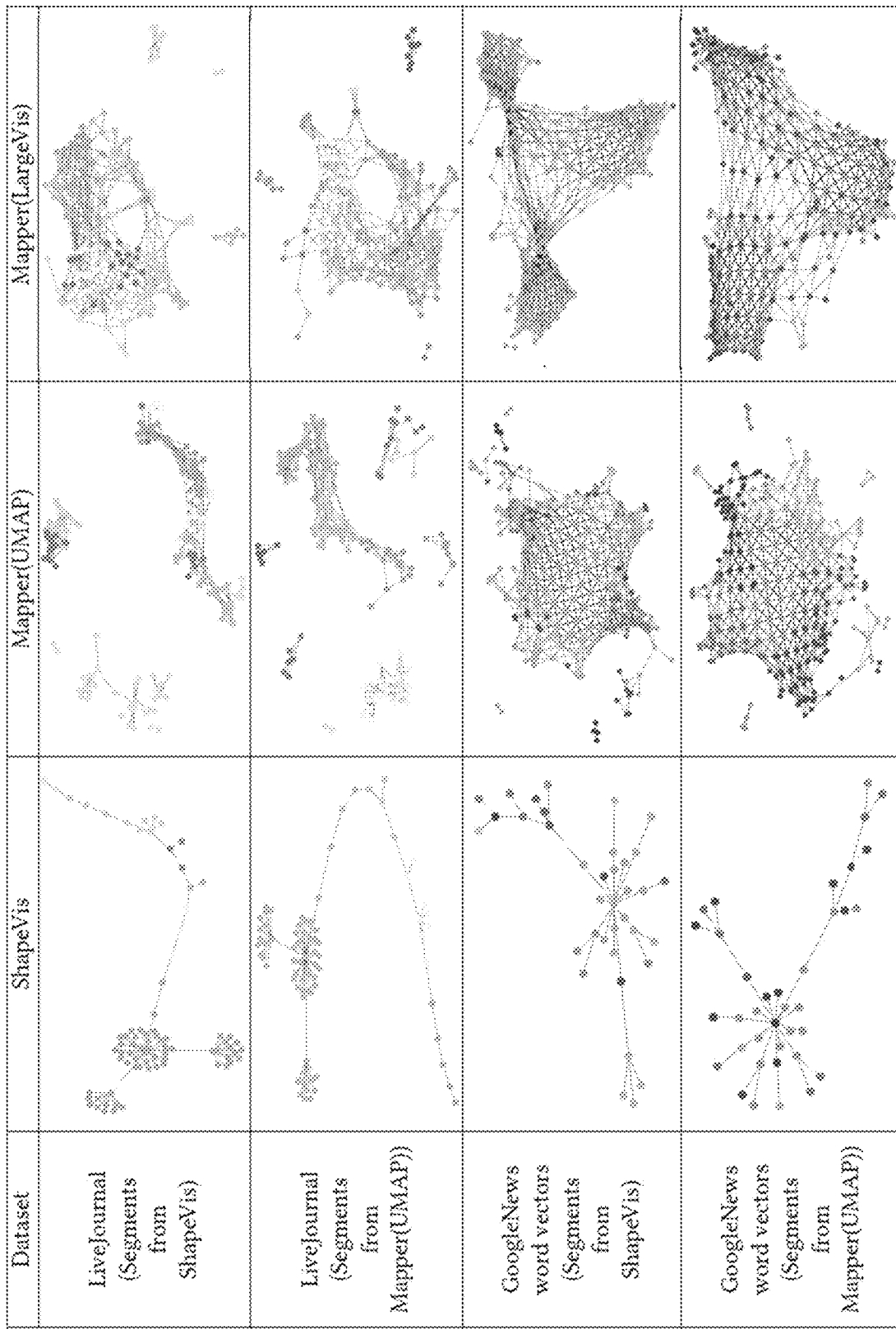
FIG. 13 illustrates another graphical representation reflecting further experimental results regarding the effectiveness of the visualization generation system in accordance with one or more embodiments.

FIG. 13 illustrates another graphical representation reflecting further experimental results regarding the effectiveness of the visualization generation system 106 in accordance with one or more embodiments. As shown in FIG. 13, the graphical representation compares the performance of one embodiment of the visualization generation system 106 with the UMAP and LargeVis versions of the mapper algorithm.

Further, the graphical representation of FIG. 13 compares performance on the LiveJournal and GoogleNews Vectors datasets. In particular, the LiveJournal dataset includes a social network dataset from an online blogging community with around four million nodes. Each node has a community label if it belongs to one of the top 5000 communities; otherwise, it is labeled as "other." The researchers used a 100-dimensional representation of each node learned using the LINE algorithm for generating the visualizations. The GoogleNews Vectors dataset includes 3 million words and phrases from the GoogleNews dataset. Each word is embedded into a 300-dimensional vector space using a word2vec approach.

For the LiveJournal and GoogleNews Vectors dataset, no ground truth class label was available. Accordingly, the researchers assigned pseudo labels to each data point in order to facilitate comparison with the visualization generation system 106. In particular, the researchers clustered the nodes of a visualization graph using a Louvain community detection method and assigned each data point the label of the community it belongs to. The researchers then colored the visualizations according to these labels. The graphical representation of FIG. 13 shows the visualizations when pseudo labels are assigned using segments of the visualization generation system 106 and the UMAP version of the mapper algorithm.

With regard to the LiveJournal dataset, FIG. 13 shows that the segments provided by the visualization generation system 106 correspond well with the segments in the UMAP and LargeVis versions of the mapper algorithm. Similarly, the segments of the provided by the UMAP version of the mapper algorithm aligning with the segments of the visualization generation system 106 and the LargeVis version of the mapper algorithm. Thus, the visualization generation system 106 provides a visualization approach that is at least comparable to the UMAP and LargeVis versions of the mapper algorithm.

With regard to the GoogleNews Vectors dataset, FIG. 13 shows that the UMAP and LargeVis versions of the mapper algorithm fail to bring any clear segmentation of the dataset via the respective visualization. Further, FIG. 13 shows that there is a lack of alignment between segments of the visualizations provided by the different approaches. Accordingly, the researchers computed the cosine similarity of word-vectors belonging to each segment of the three visualizations. For the visualization provided by the visualization generation system 106, the average cosine similarity between words of a segment equaled 0.224. For the visualizations provided by the UMAP and LargeVis versions of the mapper algorithm, the average cosine similarity equaled 0.186 and 0.132, respectively. Therefore, the visualization generation system 106 more accurately captured the structures of the underlying dataset by this measure.

Thus, the visualization generation system 106 can operate more accurately than conventional systems. Indeed, the visualization generation system 106 can more accurately capture the global and local structures of a digital dataset. Accordingly, the visualization generation system 106 can generate a visualization of a digital dataset that more accurately provides those structures.

As further mentioned above, the visualization generation system 106 can operate more efficiently than conventional systems. Researchers conducted additional studies to determine the efficiency of one or more embodiments of the visualization generation system 106 in generating visualizations for digital datasets.

FIG. 14 illustrates a table reflecting experimental results regarding the efficiency of the visualization generation system 106 in accordance with one or more embodiments. In particular, the table of FIG. 14 compares the performance of one embodiment of the visualization generation system 106 with the performance of the UMAP, LargeVis, and t-SNE versions of the mapper algorithm. Further, the table of FIG. 14 compares performance on the MNIST, FMNIST, GoogleNews Vectors (labeled "Word Vectors") and LiveJournal datasets.

The table of FIG. 14 compares the running time of each approach as tested on a machine with forty-eight gigabytes of memory and six cores. For the MNIST and FMNIST datasets, the table compares the running time on the complete dataset. For the LiveJournal and GoogleNews Vectors datasets, the table compares the running time on a 2 million and 1 million subset, respectively due to the huge memory requirements of UMAP. Accordingly, all approaches are compared on the respective subset of these datasets. The table of FIG. 14 shows the running time of each approach in seconds. As shown in FIG. 14, the increase in dataset size increases the running time of the visualization generation system 106 much less than the other tested approaches. Further, while the UMAP version of the mapper algorithm has a smaller runtime for smaller datasets, the visualization generation system 106 performs much more efficiently on the larger datasets.

FIG. 15 illustrates a table reflecting further experimental results regarding the efficiency of the visualization generation system 106 in accordance with one or more embodiments. In particular, the table of FIG. 14 compares the performance of one embodiment of the visualization generation system 106 with the performance of the UMAP, LargeVis, and t-SNE dimensionality reduction models as well as the UMAP version of the mapper algorithm. In particular, the table reflects the performance of the t-SNE dimensionality reduction model operating on multiple cores.

The table of FIG. 15 reflects performance on Glove vectors, which are 25-dimensional word vector embeddings. In particular, the table reflects performance across samples of 50 thousand words, 400 thousand words, 1 million words, 2 million words, and 5 million words. For the samples of 2 million words and 5 million words, the researchers sampled points from a uniform sphere of 25 dimensions.

The table of FIG. 15 provides "Time Out" when the approach took more than 2 hours and "Memory Overflow" when the approach took more than fifty gigabytes of RAM. As can be seen from the table, operation of the visualization generation system 106 did not result in a "Time Out" or a "Memory Overflow." Further, where numbers are available, the visualization generation system 106 performed better than each of the other approaches.

Figure 16:
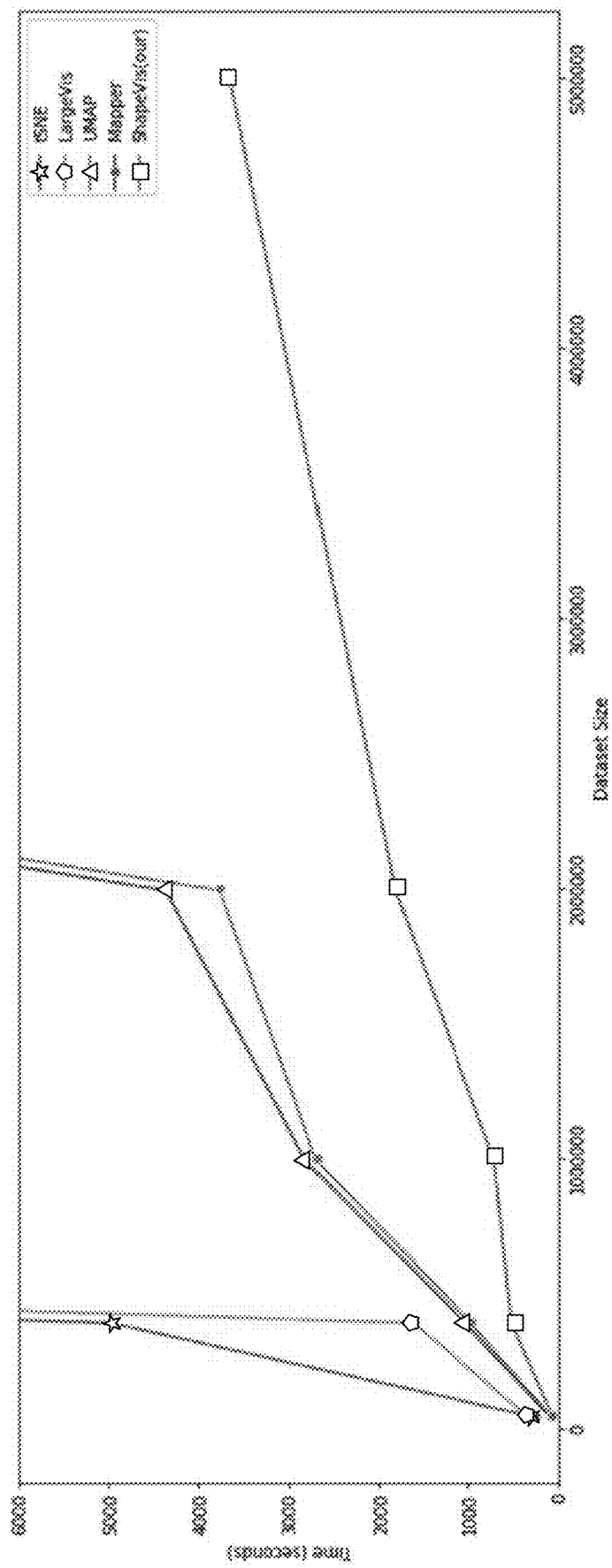
FIG. 16 illustrates a graph reflecting further experimental results regarding the effectiveness of the visualization generation system in accordance with one or more embodiments.

FIG. 16 illustrates a graph reflecting additional experimental results with regard to the efficiency of the visualization generation system 106. Indeed, the graph of FIG. 16 compares performance of one embodiment of the visualization generation system 106 with the performance of the t-SNE, LargeVis, and UMAP dimensionality reduction models as well as some version of the mapper algorithm. The table shows the runtime of each approach on some dataset in seconds. As shown in FIG. 16, the visualization generation system 106 performs more efficiently than the other approaches and continues to perform more efficiently as the size of the dataset increases.

Thus, the visualization generation system 106 can operate more efficiently than conventional systems. Indeed, the visualization generation system 106 can more efficiently capture the structures of a digital dataset to generate an interactive visual shape representation of that digital dataset. Accordingly, the visualization generation system reduces the amount of memory and computing time and power used in generating the interactive visual shape representation.

Further, the visualization generation system 106 can operate more flexibly than conventional systems. Indeed, by reducing the computational demands of generating the interactive visual shape representation, the visualization generation system can generate visualizations for larger datasets when compared to many conventional systems. Further, the visualization generation system can generate visualizations for digital datasets having a higher dimensionality than those processed by many conventional systems.

Figure 17:
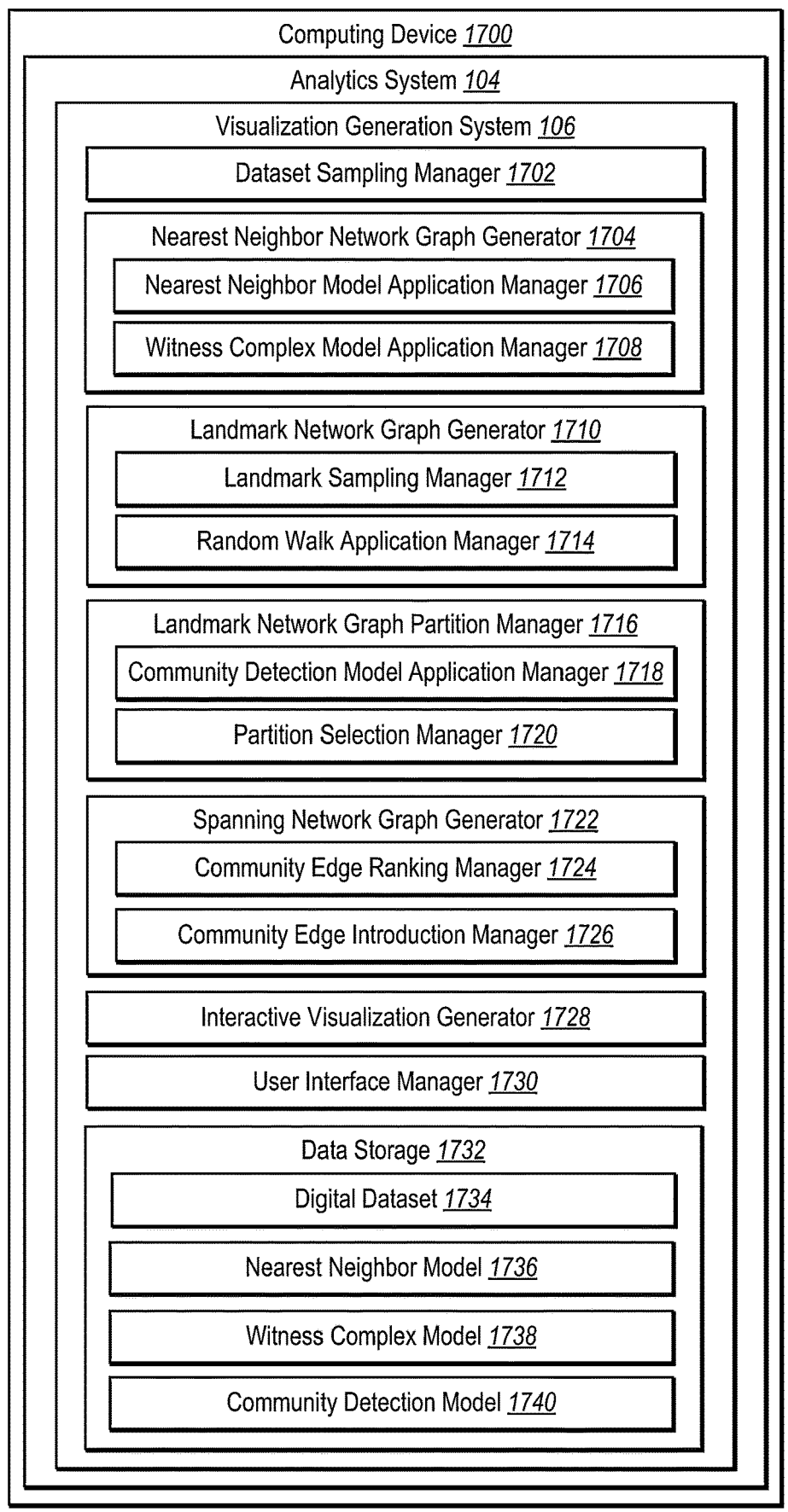
FIG. 17 illustrates an example schematic diagram of a visualization generation system in accordance with one or more embodiments.

Turning now to FIG. 17, additional detail will be provided regarding various components and capabilities of the visualization generation system 106. In particular, FIG. 17 illustrates the visualization generation system 106 implemented by the computing device 1700 (e.g., the server(s) 102, the administrator device 110, and/or one of the client devices 114a-114n as discussed above with reference to FIG. 1). Additionally, the visualization generation system 106 is also part of the analytics system 104. As shown, the visualization generation system 106 can include, but is not limited to, a dataset sampling manager 1702, a nearest neighbor network graph generator 1704 (which includes a nearest neighbor model application manager 1706 and a witness complex model application manager 1708), a landmark network graph generator 1710 (which includes a landmark sampling manager 1712 and a random walk application manager 1714), a landmark network graph partition manager 1716 (which includes a community detection model application manager 1718 and a partition selection manager 1720), a spanning network graph generator 1722 (which includes a community edge ranking manager 1724 and a community edge introduction manager 1726), an interactive visualization generator 1728, a user interface manager 1730, and data storage 1732 (which includes digital dataset 1734, nearest neighbor model 1736, witness complex model 1738, and community detection model 1740).

As just mentioned, and as illustrated in FIG. 17, the visualization generation system 106 includes the dataset sampling manager 1702. In particular, the dataset sampling manager 1702 can determine a sampled subset of digital data points from a digital dataset and an unsampled subset of digital data points from the digital dataset. Indeed, the dataset sampling manager 1702 can sample a subset of digital data points from the digital dataset and provide the sampled subset to the nearest neighbor network graph generator 1704 for generating an augmented nearest neighbor network graph. The dataset sampling manager 1702 can also provide the subset of remaining digital data points to the nearest neighbor network graph generator 1704.

Additionally, as shown in FIG. 17, the visualization generation system 106 includes the nearest neighbor network graph generator 1704. In particular the nearest neighbor network graph generator 1704 can generate an augmented nearest neighbor network graph based on sampled and unsampled digital data points received from the dataset sampling manager 1702. The nearest neighbor network graph generator 1704 includes the nearest neighbor model application manager 1706 and the witness complex model application manager 1708. The nearest neighbor model application manager 1706 can apply a nearest neighbor model to the sampled subset of digital data points to generate a nearest neighbor network graph. The witness complex model application manager 1708 can apply a witness complex model to the unsampled subset of digital data points to generate an augmented nearest neighbor network graph by connecting pairs of unconnected nodes within the nearest neighbor network graph.

Further, as shown in FIG. 17, the visualization generation system 106 includes the landmark network graph generator 1710. In particular, the landmark network graph generator 1710 can generate a landmark network graph generator 1710 that includes a plurality of landmarks and edges between the landmarks. The landmark network graph generator 1710 includes the landmark sampling manager 1712 and the random walk application manager 1714. In particular, the landmark sampling manager 1712 can sample nodes of the augmented nearest neighbor network graph generated by the nearest neighbor network graph generator 1704 to determine landmarks (e.g., by sampling digital data points from the sampled subset of digital data points). The random walk application manager 1714 can perform a plurality of random walks on the augmented nearest neighbor network graph using the landmarks as starting points to determine edges and edge strengths between the landmarks.

As shown in FIG. 17, the visualization generation system 106 further includes the landmark network graph partition manager 1716. In particular, the landmark network graph partition manager 1716 can generate a partitioned landmark network graph that includes communities of landmark groups from the landmarks and a plurality of community edges. The landmark network graph partition manager 1716 includes a community detection model application manager 1718 and a partition selection manager 1720. The community detection model application manager 1718 can apply a community detection model to the landmark network graph generated by the landmark network graph generator 1710 to generate a plurality of partitions of the landmark network graph. The partition selection manager 1720 can select a partition of the landmark network graph from the plurality of partitions as the partitioned landmark network graph.

As shown in FIG. 17, the visualization generation system 106 also includes the spanning network graph generator 1722. In particular the spanning network graph generator 1722 can generate a loop-augmented spanning network graph from the partition of the landmark network graph determined by the landmark network graph partition manager 1716 that includes the communities and a subset of the community edges. The spanning network graph generator 1722 includes a community edge ranking manager 1724 and a community edge introduction manager 1726. The community edge ranking manager 1724 can rank the community edges of the partitioned landmark network graph based on a modularity of the community edges. The community edge introduction manager 1726 can generate a spanning network graph by adding a first subset of the community edges based on the ranking and a measure of connectivity of the first subset of community edges relative to the communities. The community edge introduction manager 1726 can further generate a loop-augmented spanning network graph by adding a second subset of the community edges to complete community loops within the spanning network graph.

Further, as shown in FIG. 17, the visualization generation system 106 includes the interactive visualization generator 1728. In particular, the interactive visualization generator 1728 can generate an interactive visual shape representation of a digital dataset from the loop-augmented spanning network graph generated by the spanning network graph generator 1722. For example, the interactive visualization generator 1728 can generate a visualization that includes the nodes (i.e., the communities) and community edges of the loop-augmented spanning network graph. In one or more embodiments, the interactive visualization generator 1728 associates the nodes with a size based on the number of digital data points represented in the corresponding community. In some embodiments, the interactive visualization generator 1728 associates the nodes with a color, shade, hue, brightness, etc. based on a concentration of a particular data characteristic (e.g., user trait) within the corresponding community.

Additionally, as shown, the visualization generation system 106 includes the user interface manager 1730. In particular, the user interface manager 1730 can communicate with the interactive visualization generator 1728 to modify a display of information based on user interactions with the interactive visual shape representation. For example, upon user interaction with a node, the user interface manager 1730 communicate with the interactive visualization generator 1728 to provide a statistical visual summary of digital data points represented in the corresponding community or provide visual representations of sub-communities of the corresponding community.

As shown in FIG. 17, the visualization generation system 106 also includes data storage 1732 (e.g., implemented by one or memory devices). In particular, data storage 1732 includes digital dataset 1734 (comprising a plurality of digital data points), nearest neighbor model 1736, witness complex model 1738, and community detection model 1740. Digital dataset 1734 can store the digital dataset sampled by the dataset sampling manager 1702. Nearest neighbor model 1736 can store the nearest neighbor model applied to a sampled subset of digital data points from a digital dataset to generate a nearest neighbor network graph. Witness complex model 1738 can store a witness complex model applied to an unsampled subset of digital data points from a digital dataset to generate an augmented nearest neighbor network graph by connecting pairs of unconnected nodes within a nearest neighbor network graph. Community detection model 1740 can store a community detection model applied to a landmark network graph to determine one or more partitions of the landmark network graph.

Each of the components 1702-1740 of the visualization generation system 106 can include software, hardware, or both. For example, the components 1702-1740 can include one or more instructions stored on a computer-readable storage medium and executable by processors of one or more computing devices, such as a client device or server device. When executed by the one or more processors, the computer-executable instructions of the visualization generation system 106 can cause the computing device(s) to perform the methods described herein. Alternatively, the components 1702-1740 can include hardware, such as a special-purpose processing device to perform a certain function or group of functions. Alternatively, the components 1702-1740 of the visualization generation system 106 can include a combination of computer-executable instructions and hardware.

Furthermore, the components 1702-1740 of the visualization generation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1702-1740 of the visualization generation system 106 may be implemented as a stand-alone application, such as a desktop or mobile application. Furthermore, the components 1702-1740 of the visualization generation system 106 may be implemented as one or more web-based applications hosted on a remote server. Alternatively, or additionally, the components 1702-1740 of the visualization generation system 106 may be implemented in a suite of mobile device applications or "apps." For example, in one or more embodiments, the visualization generation system 106 can comprise or operate in connection with digital software applications such as ADOBE® AUDIENCE MANAGER or ADOBE® MARKETING CLOUD™. "ADOBE" and "MARKETING CLOUD" are either registered trademarks or trademarks of Adobe Inc. in the United States and/or other countries.

Figure 18:
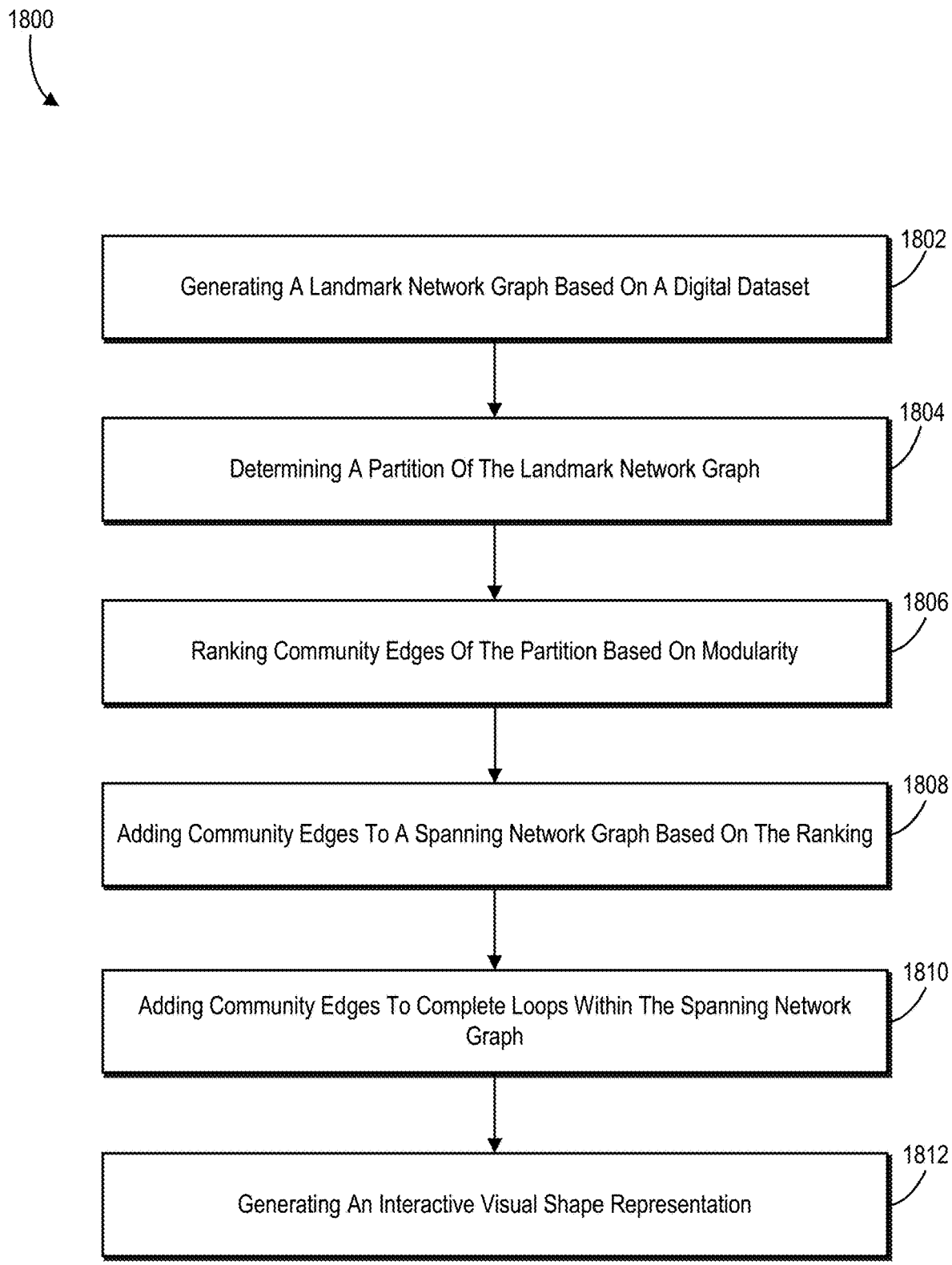
FIG. 18 illustrates a flowchart of a series of acts for generating an interactive visual shape representation for a digital dataset in accordance with one or more embodiments.

FIGS. 1-17, the corresponding text and the examples provide a number of different methods, systems, devices, and non-transitory computer-readable media of the visualization generation system 106. In addition to the foregoing, one or more embodiments can also be described in terms of flowcharts comprising acts for accomplishing the particular results, as shown in FIG. 18. FIG. 18 may be performed with more or fewer acts. Further, the acts may be performed in different orders. Additionally, the acts described herein may be repeated or performed in parallel with one another or in parallel with different instances of the same or similar acts.

As mentioned, FIG. 18 illustrates a flowchart of a series of acts 1800 for generating an interactive visual shape representation of a digital dataset in accordance with one or more embodiments. While FIG. 18 illustrates acts according to one embodiment, alternative embodiments may omit, add to, reorder and/or modify any of the acts shown in FIG. 18. The acts of FIG. 18 can be performed as part of a method. For example, in some embodiments, the acts of FIG. 18 can be performed, in a digital medium environment for analyzing digital data, as part of a computer-implemented method for visualizing relationships within datasets. Alternatively, a non-transitory computer-readable medium can store instructions thereon that, when executed by at least one processor, cause a computing device to perform the acts of FIG. 18. In some embodiments, a system can perform the acts of FIG. 18. For example, in one or more embodiments, a system includes one or more memory devices comprising a digital dataset comprising a plurality of digital data points. The system can further include one or more computer devices configured to cause the system to perform the acts of FIG. 18.

The series of acts 1800 includes an act 1802 of generating a landmark network graph based on a digital dataset. For example, the act 1802 can involve processing a digital dataset utilizing a nearest neighbor algorithm and random walks to generate a landmark network graph comprising a plurality of landmarks and edges.

In one or more embodiments, processing the digital dataset utilizing the nearest neighbor algorithm and the random walks to generate the landmark network graph comprises: determining a sampled subset of digital data points from the digital dataset and an unsampled subset of digital data points from the digital dataset; generating a nearest neighbor network graph by applying a nearest neighbor model to the sampled subset of digital data points; and generating an augmented nearest neighbor network graph by applying a witness complex model to the unsampled subset of digital data points to connect pairs of unconnected nodes within the nearest neighbor network graph.

In some embodiments, processing the digital dataset utilizing the nearest neighbor algorithm and the random walks to generate the landmark network graph further comprises: sampling a digital data point from the sampled subset of digital data points to determine a landmark of the digital dataset for representation in the landmark network graph; removing, from the sampled subset of digital data points, neighbor nodes within a threshold number of hops from the landmark within the augmented nearest neighbor network graph; and performing a plurality of random walks on the augmented nearest neighbor network graph to determine edge strengths of the landmark network graph.

To illustrate, in one or more embodiments, the visualization generation system 106 generates an augmented nearest neighbor network graph by applying a nearest neighbor model to a sampled subset of the plurality of digital data points and applying a witness complex model to a remaining subset of the plurality of digital data points. In one or more embodiments, applying the witness complex model to the remaining subset of the plurality of digital data points comprises utilizing the witness complex model to: identify a plurality of witness points from the remaining subset of the plurality of digital data points; and, for each witness point from the plurality of witness points: identify a pair of nearest neighbors within a nearest neighbor network graph generated by applying the nearest neighbor model to the sampled subset of the plurality of digital data points; determine that the pair of nearest neighbors within the nearest neighbor network graph are unconnected; and generate the augmented nearest neighbor network graph by adding an edge to connect the pair of nearest neighbors within the nearest neighbor network graph based on determining that the pair of nearest neighbors are unconnected. The visualization generation system 106 can further generate a landmark network graph by: sampling nodes of the augmented nearest neighbor network graph to determine landmarks; and determining edge strengths for edges between the landmarks by performing a plurality of random walks on the augmented nearest neighbor network graph.

The series of acts 1800 also includes an act 1804 of determining a partition of the landmark network graph. For example, the act 1804 can involve determining, based on the edges (and edge strengths), a partition of the landmark network graph comprising communities (e.g., a plurality of communities) of landmark groups from the plurality of landmarks and a plurality of community edges. In one or more embodiments, determining the partition of the landmark network graph comprises utilizing a community detection model to determine a first partition based on the landmark network graph.

Further, the series of acts 1800 includes an act 1806 of ranking community edges of the partition based on modularity. For example, the act 1806 can include generating a spanning network graph comprising the communities from the partition of the landmark network graph by ranking the plurality of community edges of the partition of the landmark network graph based on modularities of the plurality of community edges.

Additionally, the series of acts 1800 includes an act 1808 of adding community edges to a spanning network graph based on the ranking. For example, the act 1808 can include generating the spanning network graph comprising the communities from the partition of the landmark network graph by further adding a first subset of community edges to the spanning network graph based on the ranking and a measure of connectivity of the first subset of community edges relative to the communities.

The series of acts 1800 further includes an act 1810 of adding community edges to complete loops within the spanning network graph. For example, the act 1810 can include generating a loop-augmented spanning network graph by adding a second subset of community edges that complete community loops within the spanning network graph. In one or more embodiments, the first subset of community edges is associated with higher modularities than the second subset of community edges. In some instances, the visualization generation system 106 generates the loop-augmented spanning network graph by adding the second subset of community edges that complete the community loops within the spanning network graph based on the community loops having at least a predetermined number of community edges.

Thus, generally speaking, the visualization generation system 106 can generate a loop-augmented spanning network graph from the partition of the landmark network graph by adding a subset of community edges based on a measure of connectivity between the plurality of communities and to complete community loops. In some instances, generating the loop-augmented spanning network graph from the partition of the landmark network graph by adding the subset of community edges based on the measure of connectivity between the plurality of communities comprises: generating a spanning network graph comprising the plurality of communities from the partition of the landmark network graph by: generating a plurality of nodes corresponding to the plurality of communities from the partition of the landmark network graph; and adding a first subset of community edges between the plurality of nodes based on modularities of the plurality of community edges and a measure of connectivity of the first subset of community edges relative to the plurality of communities. In some instances, generating the loop-augmented spanning network graph from the partition of the landmark network graph by adding the subset of community edges to complete the community loops further comprises adding a second subset of community edges to the spanning network graph to generate the loop-augmented spanning network graph based on the community loops having at least a predetermined number of community edges.

The series of acts 1800 also includes an act 1812 of generating an interactive visual shape representation. For example, the act 1812 can include generating an interactive visual shape representation of the digital dataset from the loop-augmented spanning network graph for display on a client device. In one or more embodiments, the interactive visual shape representation comprises the communities (i.e., the plurality of communities) from the partition of the landmark network graph. Indeed, in some embodiments, generating the interactive visual shape representation of the digital dataset comprises generating a visual network graph comprising a plurality of communities of the loop-augmented spanning network graph. In one or more embodiments, the interactive visual shape representation of the digital dataset comprises visual indicators representing concentrations of a data characteristic within the communities. In some instances, a given community of the plurality of communities comprises a size corresponding to a number of digital data points represented by the given community.

In one or more embodiments, the series of acts 1800 further includes acts for providing additional information for display on the client device in response to user interactions with the interactive visual shape representation. For example, in one or more embodiments, the acts include receiving a user interaction with a community of the interactive visual shape representation of the digital dataset; and, in response to receiving the user interaction with the community: determining a partition of the community comprising sub-communities of landmark groups associated with the community; and providing, for display on the client device, visual representations of the sub-communities and a plurality of edges between the visual representations.

To illustrate, in one or more embodiments, the visualization generation system 106 receives a user interaction with a selected community of the interactive visual shape representation of the digital dataset; and in response to the user interaction with the selected community, provides, for display on the client device, visual representations of sub-communities corresponding to the selected community and a plurality of edges between the visual representations of the sub-communities. In one or more embodiments, providing the visual representations of the sub-communities corresponding to the selected community and the plurality of edges between the visual representations of the sub-communities comprises applying the community detection model to landmarks from the landmark networking graph corresponding to the selected community to determine a second partition comprising the sub-communities.

In some instances, the acts include receiving a user interaction with one or more communities of the interactive visual shape representation of the digital dataset; and, in response to the user interaction with the one or more communities, providing, for display on the client device, a statistical visual summary of digital data from the digital dataset, the digital data corresponding to the one or more communities. Indeed, in some instances, the digital data from the digital dataset corresponds to a plurality of user profiles. Accordingly, the statistical visual summary of the digital data can include statistics corresponding to user traits associated with the plurality of user profiles. Indeed, in some instances, the plurality of digital data points of the digital dataset correspond to a plurality of user profiles. Accordingly, the acts can include receiving a user interaction with a visual element of the interactive visual shape representation of the digital dataset, wherein the visual element corresponds to a community of user profiles; and, in response to the user interaction with the visual element, providing, for display on the client device, a statistical visual summary of the community of user profiles represented by the visual element.

In one or more embodiments, the acts include receiving a user interaction with a plurality of communities of the interactive visual shape representation of the digital dataset; and, in response to the user interaction with the plurality of communities, providing, for display on the client device, a statistical visual summary of digital data points from the digital dataset that correspond to the plurality of communities.

In some embodiments, the acts include receiving a user selection of a data characteristic represented in the digital dataset via a graphical user interface displayed on the client device. Accordingly, the interactive visual shape representation of the digital dataset can include visual indicators representing concentrations of the data characteristic within communities of the digital data points.

Further, in some instances, the series of acts 1800 can include performing a step for generating a partitioned landmark network graph based on a plurality of digital data points of a digital dataset. Indeed, the algorithms and acts described with reference to FIGS. 4A-6 can comprise the corresponding structure for performing a step for generating a partitioned landmark network graph based on a plurality of digital data points of a digital dataset.

Additionally, in some embodiments, the series of acts 1800 can include acts for performing a step for generating a loop-augmented spanning network graph based on the partitioned landmark network graph. Indeed, the algorithms and acts described with reference to FIGS. 7A-7B can comprise the corresponding structure for performing a step for generating a loop-augmented spanning network graph based on the partitioned landmark network graph.

In some embodiments, the algorithms and acts described with reference to Algorithm 1 can comprise the corresponding structure for performing a step for generating a partitioned landmark network graph based on a plurality of digital data points of a digital dataset and performing a step for generating a loop-augmented spanning network graph based on the partitioned landmark network graph.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 19:
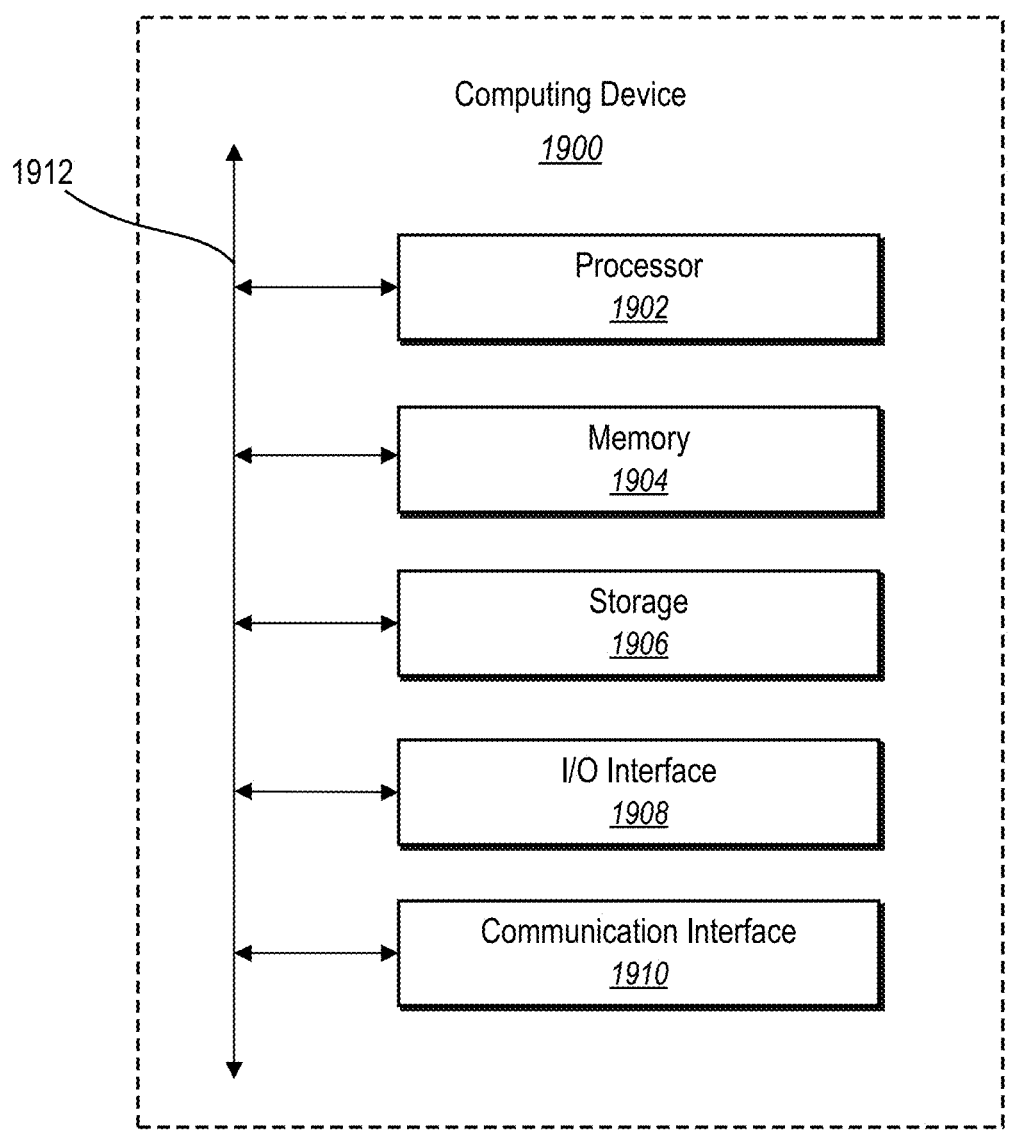
FIG. 19 illustrates a block diagram of an exemplary computing device in accordance with one or more embodiments.

FIG. 19 illustrates a block diagram of an example computing device 1900 that may be configured to perform one or more of the processes described above. One will appreciate that one or more computing devices, such as the computing device 1900 may represent the computing devices described above (e.g., the server(s) 102, the administrator device 110, and/or the client devices 114a-114n). In one or more embodiments, the computing device 1900 may be a mobile device (e.g., a mobile telephone, a smartphone, a PDA, a tablet, a laptop, a camera, a tracker, a watch, a wearable device). In some embodiments, the computing device 1900 may be a non-mobile device (e.g., a desktop computer or another type of client device). Further, the computing device 1900 may be a server device that includes cloud-based processing and storage capabilities.

As shown in FIG. 19, the computing device 1900 can include one or more processor(s) 1902, memory 1904, a storage device 1906, input/output interfaces 1908 (or "I/O interfaces 1908"), and a communication interface 1910, which may be communicatively coupled by way of a communication infrastructure (e.g., bus 1912). While the computing device 1900 is shown in FIG. 19, the components illustrated in FIG. 19 are not intended to be limiting. Additional or alternative components may be used in other embodiments. Furthermore, in certain embodiments, the computing device 1900 includes fewer components than those shown in FIG. 19. Components of the computing device 1900 shown in FIG. 19 will now be described in additional detail.

In particular embodiments, the processor(s) 1902 includes hardware for executing instructions, such as those making up a computer program. As an example, and not by way of limitation, to execute instructions, the processor(s) 1902 may retrieve (or fetch) the instructions from an internal register, an internal cache, memory 1904, or a storage device 1906 and decode and execute them.

The computing device 1900 includes memory 1904, which is coupled to the processor(s) 1902. The memory 1904 may be used for storing data, metadata, and programs for execution by the processor(s). The memory 1904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1904 may be internal or distributed memory.

The computing device 1900 includes a storage device 1906 including storage for storing data or instructions. As an example, and not by way of limitation, the storage device 1906 can include a non-transitory storage medium described above. The storage device 1906 may include a hard disk drive (HDD), flash memory, a Universal Serial Bus (USB) drive or a combination these or other storage devices.

As shown, the computing device 1900 includes one or more I/O interfaces 1908, which are provided to allow a user to provide input to (such as user strokes), receive output from, and otherwise transfer data to and from the computing device 1900. These I/O interfaces 1908 may include a mouse, keypad or a keyboard, a touch screen, camera, optical scanner, network interface, modem, other known I/O devices or a combination of such I/O interfaces 1908. The touch screen may be activated with a stylus or a finger.

The I/O interfaces 1908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1908 are configured to provide graphical data to a display for presentation to a user. The graphical data may be representative of one or more graphical user interfaces and/or any other graphical content as may serve a particular implementation.

The computing device 1900 can further include a communication interface 1910. The communication interface 1910 can include hardware, software, or both. The communication interface 1910 provides one or more interfaces for communication (such as, for example, packet-based communication) between the computing device and one or more other computing devices or one or more networks. As an example, and not by way of limitation, communication interface 1910 may include a network interface controller (NIC) or network adapter for communicating with an Ethernet or other wire-based network or a wireless NIC (WNIC) or wireless adapter for communicating with a wireless network, such as a WI-FI. The computing device 1900 can further include a bus 1912. The bus 1912 can include hardware, software, or both that connects components of computing device 1900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing executable instructions, which when executed by a processing device, cause the processing device to perform operations comprising:
    processing a digital dataset utilizing a nearest neighbor algorithm and random walks to generate a landmark network graph comprising a plurality of landmarks and a plurality of edges;
    generating a spanning network graph comprising communities from a partition of the landmark network graph;
    generating a loop-augmented spanning network graph by adding a subset of community edges that complete community loops within the spanning network graph; and
    generating an interactive visual shape representation of the digital dataset from the loop-augmented spanning network graph for display on a client device.

2. The non-transitory computer-readable medium as recited in claim 1, wherein processing the digital dataset utilizing the nearest neighbor algorithm and random walks to generate the landmark network graph comprises:
    sampling a subset of digital data points from the digital dataset;
    generating a nearest neighbor network graph by applying a nearest neighbor model to the subset of digital data points; and
    generating an augmented nearest neighbor network graph by applying a witness complex model to an unsampled subset of digital data points to connect pairs of unconnected nodes within the nearest neighbor network graph.

3. The non-transitory computer-readable medium as recited in claim 2, wherein the operations further comprise utilizing a Finite Markov Chain to weight edges and encode similarities between landmarks in the augmented nearest neighbor network graph.

4. The non-transitory computer-readable medium as recited in claim 1, wherein generating the spanning network graph comprises:
    determining modularities of the plurality of edges;
    ranking the plurality of edges based on the determinized modularities; and
    adding edges to the spanning network graph based on the ranking and whether a given edge increases connectivity of the spanning network graph.

5. The non-transitory computer-readable medium as recited in claim 4, wherein generating the loop-augmented spanning network graph by adding the subset of community edges that complete community loops within the spanning network graph comprises adding community edges whose sum of modularities is greater than or equal to a predetermined hyperparameter.

6. The non-transitory computer-readable medium as recited in claim 1, wherein generating an interactive visual shape representation of the digital dataset comprises generating a visual network graph comprising a plurality of communities of the loop-augmented spanning network graph, wherein a given community of the plurality of communities comprises a size corresponding to a number of digital data points represented by the given community.

7. The non-transitory computer-readable medium as recited in claim 1, wherein the operations further comprise:
    receiving a user interaction with a selected community of the interactive visual shape representation of the digital dataset; and
    providing visual representations of sub-communities corresponding to the selected community and a plurality of sub-community edges between the visual representations of the sub-communities.

8. A method comprising:
    processing a digital dataset utilizing a nearest neighbor algorithm and random walks to generate a landmark network graph comprising a plurality of landmarks and a plurality of edges representing a topology of a data manifold;
    determining, utilizing a community detection model, a partition of the landmark network graph that comprises communities of landmark groups by weighting edges of the plurality of edges based on a random movement of a hypothetical particle on the data manifold;
    generating a spanning network graph comprising communities from the partition of the landmark network graph; and
    generating an interactive visual shape representation of the digital dataset from the spanning network graph for display on a client device.

9. The method of claim 8, wherein weighting the edges based on a random movement of a hypothetical particle on the data manifold comprises utilizing a Finite Markov Chain to weight edges and encode similarities between landmarks.

10. The method of claim 8, further comprising generating a loop-augmented spanning network graph by adding a subset of community edges that complete community loops within the spanning network graph.

11. The method of claim 10, wherein generating the interactive visual shape representation of the digital dataset from the spanning network graph comprises generating the interactive visual shape representation of the digital dataset from the loop-augmented spanning network graph.

12. The method of claim 8, wherein determining, utilizing the community detection model, the partition of the landmark network graph comprises utilizing a Louvain-based community detection model that utilizes greedy optimization that determines the communities of landmark groups based on increasing an overall modularity of the partition.

13. The method of claim 8, wherein determining, utilizing the community detection model, the partition of the landmark network graph comprises utilizing the community detection model to generate a plurality of partitions.

14. The method of claim 13, wherein utilizing the community detection model to generate the plurality of partitions comprises generating a dendrogram structure that includes several levels of partitions.

15. A system comprising:
one or more memory devices; and
one or more processor devices that cause the system to perform operations comprising:
processing a digital dataset utilizing a nearest neighbor algorithm and random walks to generate a landmark network graph comprising a plurality of landmarks and a plurality of edges;
generating a spanning network graph comprising communities from a partition of the landmark network graph;
generating a loop-augmented spanning network graph by adding a subset of community edges that complete community loops within the spanning network graph; and
generating an interactive visual shape representation of the digital dataset from the loop-augmented spanning network graph for display on a client device.

16. The system of claim 15, wherein processing the digital dataset utilizing the nearest neighbor algorithm and random walks to generate the landmark network graph comprises:
sampling a subset of digital data points from the digital dataset;
generating a nearest neighbor network graph by applying a nearest neighbor model to the subset of digital data points; and
generating an augmented nearest neighbor network graph by applying a witness complex model to an unsampled subset of digital data points to connect pairs of unconnected nodes within the nearest neighbor network graph.

17. The system of claim 16, wherein the operations further comprise utilizing a Finite Markov Chain to weight edges and encode similarities between landmarks in the augmented nearest neighbor network graph.

18. The system of claim 15, wherein generating the spanning network graph comprises:
determining modularities of the plurality of edges;
ranking the plurality of edges based on the determinized modularities; and
adding edges to the spanning network graph based on the ranking and whether a given edge increases connectivity of the spanning network graph.

19. The system of claim 15, wherein generating the loop-augmented spanning network graph by adding the subset of community edges that complete community loops within the spanning network graph comprises adding community edges whose sum of modularities is greater than or equal to a predetermined hyperparameter.

20. The system of claim 15, wherein the operations further comprise:
receiving a user interaction with a selected community of the interactive visual shape representation of the digital dataset; and
providing visual representations of sub-communities corresponding to the selected community and a plurality of sub-community edges between the visual representations of the sub-communities.

* * * * *